United States Patent
Maekawa et al.

(10) Patent No.: US 8,424,347 B2
(45) Date of Patent: Apr. 23, 2013

(54) WASHER DRYER

(75) Inventors: Sari Maekawa, Yokohama (JP);
Kazunobu Nagai, Yokohama (JP);
Tsuyoshi Hosoito, Seto (JP)

(73) Assignees: Kabushiki Kaisha Toshiba, Tokyo (JP);
Toshiba Consumer Electronics Holdings Corporation, Tokyo (JP);
Toshiba Home Appliances Corporation, Tokyo (JP)

( * ) Notice: Subject to any disclaimer, the term of this patent is extended or adjusted under 35 U.S.C. 154(b) by 896 days.

(21) Appl. No.: 12/548,914

(22) Filed: Aug. 27, 2009

(65) Prior Publication Data
US 2010/0050703 A1 Mar. 4, 2010

(30) Foreign Application Priority Data

Aug. 28, 2008 (JP) ................. 2008-219610

(51) Int. Cl.
*D06F 37/30* (2006.01)
*D06F 25/00* (2006.01)
(52) U.S. Cl.
USPC .............................. 68/12.16; 68/20
(58) Field of Classification Search ................ 68/12.02, 68/12.14, 12.16, 20
See application file for complete search history.

(56) References Cited

U.S. PATENT DOCUMENTS

| | | | |
|---|---|---|---|
| 5,913,952 A * | 6/1999 | Kim ................................ | 8/159 |
| 6,257,027 B1 * | 7/2001 | Imai ............................ | 68/12.12 |
| 6,539,753 B1 * | 4/2003 | Ito et al. ......................... | 68/3 R |
| 6,737,828 B2 * | 5/2004 | Kiuchi et al. .................. | 318/779 |
| 7,017,377 B2 * | 3/2006 | Hosoito et al. ............... | 68/12.16 |
| 2004/0245949 A1 * | 12/2004 | Ueda et al. ..................... | 318/254 |
| 2004/0245961 A1 * | 12/2004 | Ueda et al. ..................... | 318/805 |
| 2007/0145941 A1 * | 6/2007 | Asada et al. .................. | 318/811 |
| 2008/0297098 A1 * | 12/2008 | Hollenbeck et al. .......... | 318/757 |
| 2009/0211309 A1 * | 8/2009 | Kawabata et al. ................ | 68/20 |

FOREIGN PATENT DOCUMENTS

| | | |
|---|---|---|
| JP | 2002-291276 | 10/2002 |
| JP | 2003-225493 | 8/2003 |

(Continued)

OTHER PUBLICATIONS

Notice of Allowance issued on Aug. 31, 2011 in the corresponding Korean Patent Application No. 10-2009-0079545 (with English Translation).

(Continued)

*Primary Examiner* — Joseph L Perrin
(74) *Attorney, Agent, or Firm* — Oblon, Spivak, McClelland, Maier & Neustadt, L.L.P.

(57) ABSTRACT

A washer dryer including a DC power supply generator that generates a DC power supply from an AC power supply; a heat pump that circulates refrigerant between a compressor, a condenser and an evaporator; an air circulatory path that circulates air between the condenser and the evaporator; a first inverter circuit that receives the DC power supply to drive a compressor motor; a rotary tub disposed rotatably within an exterior tub; a rotary tub motor that directly drives the rotary tub at least during dehydration; a second inverter circuit that receives the DC power supply having an output terminal connected to windings of the rotary tub motor; a voltage detector that detects DC voltage occurring between the second inverter circuit and a power supply bus; a brake controller that controls the DC voltage within a predetermined range by controlling a regenerative electric power when braking is applied.

3 Claims, 20 Drawing Sheets

FOREIGN PATENT DOCUMENTS

| | | |
|---|---|---|
| JP | 2007-202311 | 8/2007 |
| JP | 2008-018131 | 1/2008 |
| KR | 10-2008-0094564 A | 10/2003 |
| KR | 10-0977925 | 8/2010 |
| WO | WO 2006/075742 A1 | 7/2006 |

OTHER PUBLICATIONS

Office Action issued Aug. 21, 2012, in Japanese Patent Application No. 2008-219610, filed Aug. 28, 2008 (with English-language Translation).

* cited by examiner

| FIG.17A | FIG.17B |

WASHER DRYER

CROSS-REFERENCE TO RELATED APPLICATIONS

This application is based upon and claims the benefit of priority from the prior Japanese Patent Application 2008-219610, filed on, Aug. 28, 2008 the entire contents of which are incorporated herein by reference.

FIELD

The present disclosure relates to a washer dryer that executes dry through heat exchange carried out by a heat pump, and that is provided with a rotary tub motor that directly drives the rotary tub at least during dehydration.

BACKGROUND

Rotation of rotary tub of a washing machine during dehydration may go up to an order of 1000 rpm at maximum. To bring such high speed rotation to a halt in a short period of time, braking needs to be applied. One example of such braking is regenerative braking in which winding current, being opposite in phase to the induced voltage of motor, is generated by applying voltage delayed in phase relative to the induced voltage on motor windings. Electric power generated by regenerative braking is supplied to the DC (Direct Current) power supply circuit through diodes connected in reverse parallel to switching elements that constitute the inverter circuit. The supplied power charges the condensers constituting the DC power supply circuit to increase the DC voltage.

Under such configuration, the manner in which the increased DC voltage is controlled determines the measures taken in preventing circuit element breakdown, circuit size, and duration of braking. For instance, JP 2003-225493 A discloses a technology that eliminates the need of discharge resistors for consuming excess electric power by controlling the phase command of the energization signal and determining the voltage command based on the detected DC voltage.

In the field of washing machines, more and more models now come with a dry feature and some of such models incorporate a heat pump comprising a compressor to realize the dry feature. Such washer dryer is provided with a compressor motor for driving the compressor in addition to the washer motor for driving the rotary tub. Given such prerequisite configuration, a potential challenge to the industry may be a further efficient control of regenerative electric power.

SUMMARY

One of the advantages of the present invention is that is provides a washer dryer that executes optimal control of regenerative electric power under a configuration including a compressor.

In one aspect, there is provided a washer dryer including a direct current power supply generator that generates a direct current power supply from an alternating current power supply; a heat pump including a compressor, a condenser, and an evaporator, the heat pump being configured to circulate refrigerant so as to be compressed at the compressor, condensed at the condenser and evaporated at the evaporator; an air circulatory path that introduces air heated at the condenser into a dry chamber and carrying exhaust discharged from the dry chamber to the evaporator for dehumidification to thereafter circulate the air back to the condenser for subsequent heating; a first inverter circuit that receives the direct current power supply generated by the direct current power supply generator to drive a compressor motor provided in the compressor; a rotary tub disposed rotatably within an exterior tub; a rotary tub motor that directly drives the rotary tub at least during dehydration; a second inverter circuit that receives the direct current power supply generated by the direct current power supply generator and having an output terminal connected to windings of the rotary tub motor; a voltage detector that detects a direct current voltage occurring between power supply buses of the second inverter circuit; a brake controller that, when a braking is operated upon completion of the dehydration, controls the direct current voltage within a predetermined range by controlling a regenerative electric power generated by the rotary tub motor.

According to the above described configuration, braking applied for terminating dehydration is controlled by the brake controller through adjustment in regenerative electric power generated by rotary tub motor. In doing so, the regenerative electric power can be advantageously consumed by the drive system of the compressor motor as well by energizing the compressor motor through the first inverter circuit, being driven by the same power supply as the second inverter circuit. Such arrangement improves the effectiveness of regenerative braking to allow the rotary tub to be stopped in relatively shorter period of time.

DETAILED DESCRIPTION

Figure 19:
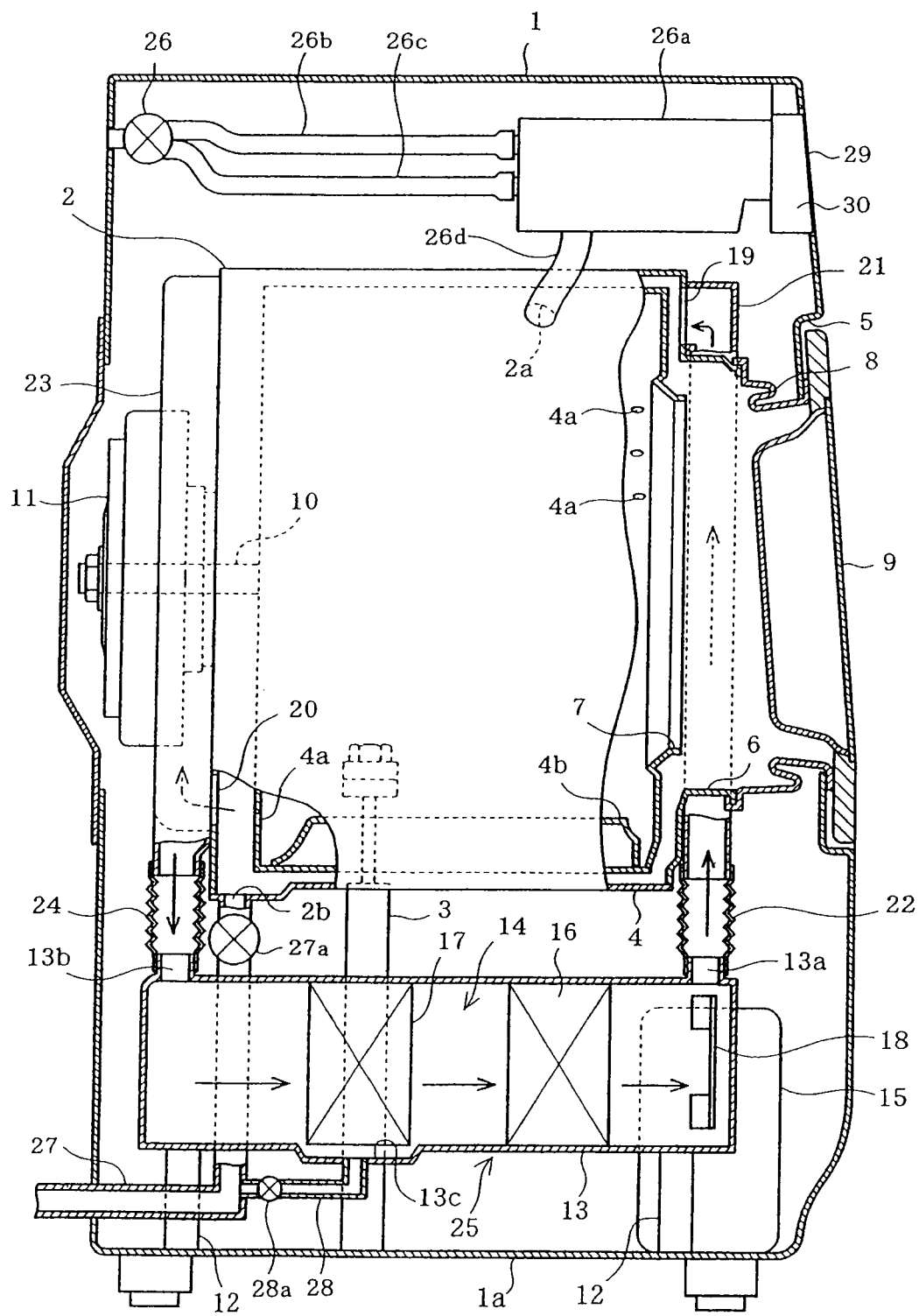
FIG. 19 is a vertical cross sectional side view of a washer dryer.

One exemplary embodiment of the present invention applied to laundry equipment, more specifically, to a heat pump washer dryer will be described hereinafter with reference to the drawings. FIG. 19 is a vertical cross sectional view of a washer dryer. As shown in FIG. 19, housing 1 contains water tub 2 (exterior tub) which is elastically supported by a plurality of support sections 3 so as to be oriented horizontally. Water tub 2 contains rotary drum 4, which may also be described as a rotary tub or a dry chamber provided coaxially with water tub 2. Rotary drum 4 is provided with multiplicity of dehydrate pores 4a, though only partially shown, defined on its peripheral wall and rear wall that also serve as air pores. Thus, rotary drum 4 also functions as a washtub, a dehydrate tub, and a dry chamber. Rotary drum 4 is further provided with a plurality of baffles 4b on its inner surface, only one of which is shown for simplicity.

Housing 1, water tub 2 and rotary tub 4 each have openings 5, 6, and 7 respectively at their front sides (right side as viewed in FIG. 19), for loading and unloading of laundry. Openings 5 and 6 establish a watertight communication through elastically deformable bellows. Opening 5 of housing 1 is opened/closed by door 9. Rotary tub 4 is provided with rotary shaft 10 extending from its rear surface which is supported by a bearing not shown to be driven by drum motor 11. Drum motor 11 is also referred to as a rotary tub motor comprising an outer rotor three-phase brushless DC motor mounted on the rear exterior of water tub 2. Thus, rotary drum 4 is driven in a direct drive method by drum motor 11.

Figure 20:
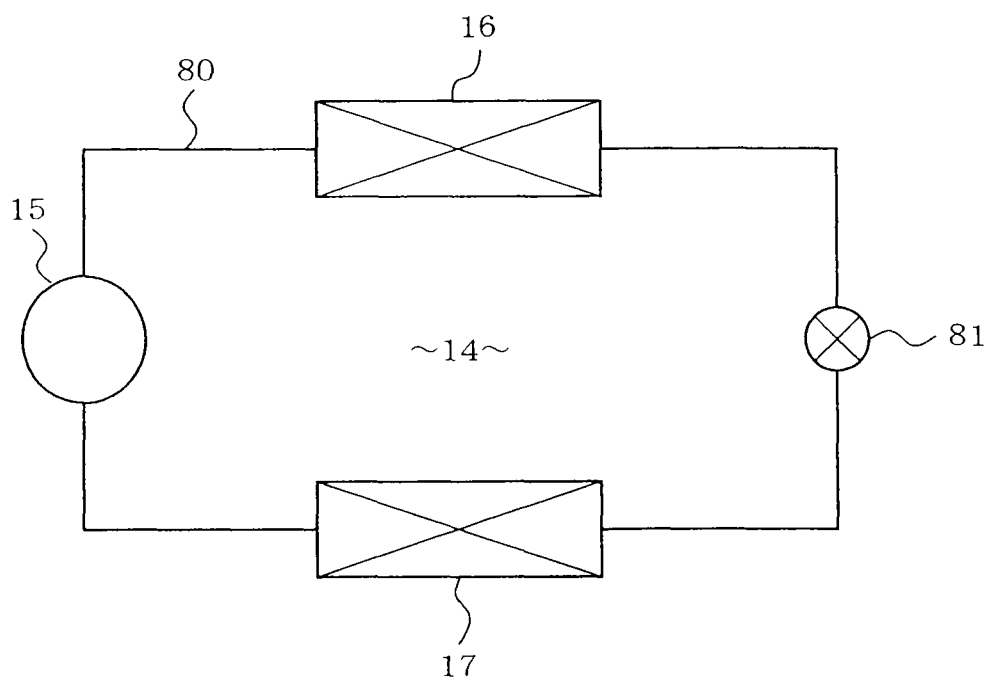
FIG. 20 describes the configuration of a heat pump.

On bottom plate la of housing 1, casing 13 is provided via a plurality of support elements 12. Casing 13 has exhaust 13a defined on its upper right end and inlet 13b on its upper left end respectively. Bottom plate la further has compressor 15 of refrigeration cycle heat pump 14 provided on it. Casing 13 contains condenser 16 and evaporator 17 of heat pump 14 in the listed sequence from right to left. Casing 13 further contains blower fan 18 in its right end interior. FIG. 20 describes the configuration of heat pump 14 with its components interconnected by pipe 80 for refrigerant circulation. FIG. 20 also shows control valve 81 that controls the amount of refrigerant flow. Further provided within casing 13 is a disc-shaped water receptacle 13c located below evaporator 17.

Water tub 2 has intake 19 at its upper front face and exhaust 20 at its lower rear face. Intake 19 communicates with outlet 13a of casing 13 through linear duct 21 and an extendible connection duct 22. Exhaust 20 communicates with inlet 13b of casing 13 through annular duct 23 and an extendible connection duct 24. Annular duct 23 is mounted at the rear exterior of water tub 2, so as to be co-axial with drum motor 11. That is, the entrance of annular duct 23 is connected to exhaust 20 and its exit is connected to inlet 13b through connection duct 24. Casing 13, connection duct 22, linear duct 21, intake 19, exhaust 20, annular duct 23 and connection duct 14 constitute air circulation path 25.

Housing 1 further contains a three-way water valve 26 at its upper rear portion and detergent dispenser 26a at its upper front portion. Water valve 26 has its water intake connected to a faucet through a supply hose for taking in tap water; its first water outlet connected to the upper water inlet of detergent dispenser 26a through wash water hose 26c; and a second water outlet connected to the lower water inlet of detergent dispenser 26a through rinse water hose 26b. The water outlet of detergent dispenser 26a is connected to supply port 2a defined on the upper portion of water tub 2 through water hose 26d.

At the bottom rear portion of water tub 2, drain section 2b is defined which is connected to drain valve 27a through drain hose 27. A portion of drain hose 27 is configured to be extendible. Water receptacle 13c of casing 13 is connected to an intermediate portion of drain hose 27 through drain hose 28 and check valve 28a.

Control panel 29 is provided on the upper front face of housing 1 and includes user interfaces such as a display and various operation switches not shown. Control circuit (brake controller, brake supporter) 30 is provided on the rear side of control panel 29. Control circuit 30 is configured by a microcomputer and executes wash, rinse, and dehydrate operations through control of water valve 26, drum motor 11, and drain valve 27a, and executes dry operation through control of drum motor 11 and compressor 15 driven by a compressor motor 31 shown in FIG. 16 comprising a three-phase brushless DC motor in response to user operation of operation switches provided on control panel 29.

Figures 16, 16A:
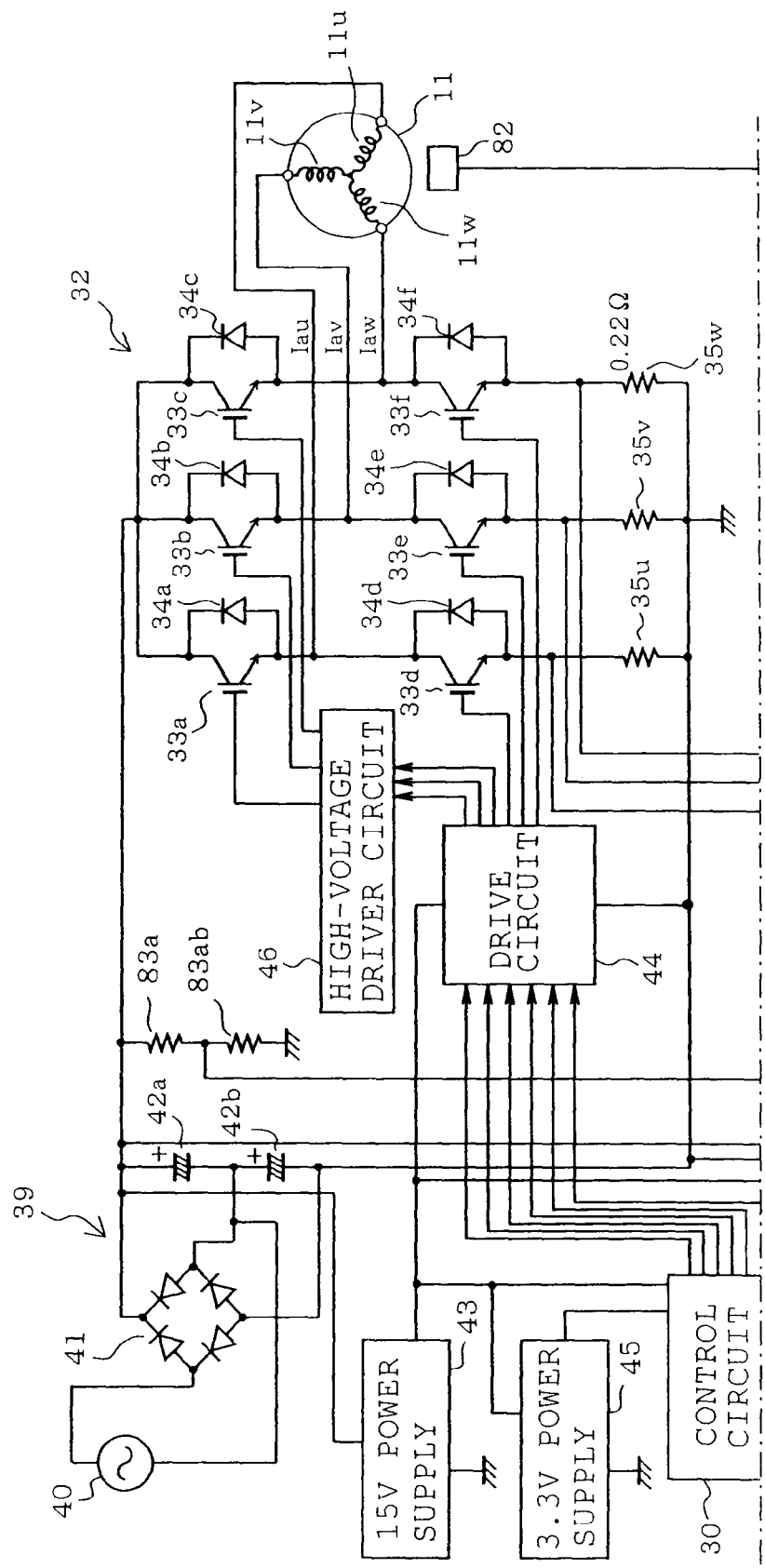
FIGS. 16A and 16B provide schematic illustration of drive systems for drum motor and compressor motor.
Figure 16B:
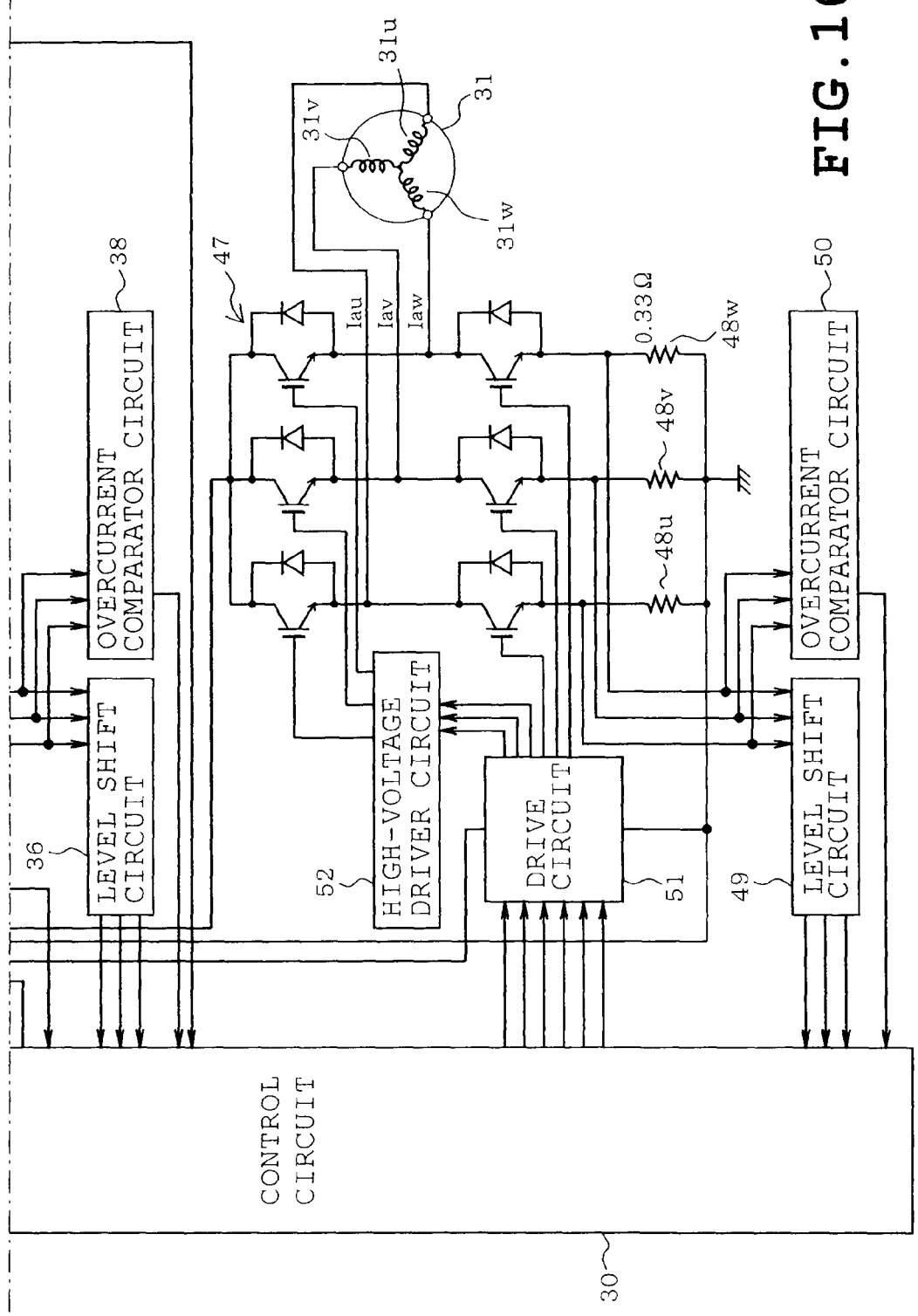

FIG. 16 schematically illustrates the drive system of drum motor 11 and compressor motor 31. Inverter circuit 32 constituting a second inverter circuit employing a PWM control method is configured by a three-phase bridge connection of six semiconductor switching devices such as IGBTs (Insulated Gate Bipolar Transistor) 33a to 33f. Each of the six IGBTs 33a to 33f has one of flywheel diodes 34a to 34f connected between its collector and emitter.

Emitters of IGBTs 33d, 33e, 33f situated in the lower arm are grounded through shunt resistances 35u, 35v, and 35w that constitute the current detector. The common connection point between the emitters of IGBTs 33d, 33e, and 33f and shunt resistances 35u, 35v, and 35w are connected to control circuit 30 through level shift circuit 36. Windings 11u to 11w of drum motor 11 carry maximum current flow of 7A and thus, shunt resistances 35u to 35w are set at 0.22Ω, for example.

Level shift circuit 36 includes components such as operational amplifiers to amplify the terminal voltages of shunt resistance 35u to 35w and biases the range of output of the amplified signal so that it stays in the positive side as in 0 to +3.3V. Overcurrent comparator circuit 38 detects overcurrent to prevent circuit breakdown when the upper or the lower arm of inverter circuit 32 is short circuited.

Inverter circuit 32 has drive power supply circuit 39 constituting the direct current power supply generator connected to its input side. Drive power supply circuit 39 supplies AC (Alternating Current) power supply 40 of 100V to inverter circuit 32 after converting it into DC voltage of approximately 280V through voltage doubling rectification carried out by full-wave rectifier circuit 41 configured by a diode bridge and a couple of series connected condensers 42a and 42b. Each of the phase output terminals of inverter circuit 32 is connected to one of phase windings 11u, 11v, and 11w of drum motor 11.

Control circuit 30 detects current values Iau to Iaw through level shift circuit 36. Based on the detected current values, control circuit 30 produces estimate phase θ and estimate rotational angular speed ω of revolving magnetic field of the secondary side and obtains excitation current component Id and torque current component Iq by orthogonal coordinate transformation and d-q (direct-quadrature) coordinate transformation of the three phase current values.

Then, control circuit 30, when receiving a speed command from external components, produces current command Id_ref and current command Iq_ref based on estimate phase θ, estimate rotational angular speed ω, and current components Id and Iq. Then current command Id_ref and current command Iq_ref are converted into voltage commands Vd and Vq which are thereafter subjected to orthogonal coordinate transformation and three phase coordinate transformation. Finally, drive signal is generated as PWM signal to be outputted to windings 11u to 11w of drum motor 11 through inverter circuit 32.

Drive power supply of approximately 280V supplied to inverter circuit 32 is stepped down by first power supply circuit 43 to produce a control power supply of 15V which is supplied to control circuit 30 and drive circuit 44. The 15V power supply generated by first power supply circuit 43 is utilized by second power supply circuit 45 as source for generating 3.3V power supply which is thereafter supplied to control circuit 30. Second power supply circuit 45 is configured as a three-terminal regulator. IGBTs 33a to 33c at the upper arm of inverter circuit 32 are driven by high-voltage driver circuit 46.

Drum motor 11 is provided with a rotational position sensor 82 disposed at its rotor which is used at startup. Position signal of the rotor outputted by rotational position sensor 82 is given to control circuit 30. That is, during startup of drum motor 11, field oriented control (vector control) is executed using rotational position sensor 82 until sufficient rotational speed of 30 rpm, for example, is reached that would allow estimation of rotor position, and after reaching such rotational speed, position sensorless field oriented control is executed without using rotational position sensor 82.

Compressor motor 31 has a drive system which is substantially symmetrical to drum motor 11. To elaborate, compressor motor 31 is driven by inverter circuit 47 constituting a first inverter circuit employing a PWM control method and which has shunt resistances 48u to 48w constituting the current detector inserted in its lower arm. Terminal voltages of shunt resistances 48u to 48w are given to control circuit 30 through level shift circuit 49 and are compared at overcurrent comparator circuit 50 for overcurrent detection.

Control circuit 30 drives inverter circuit 47 through drive circuit 51 and high-voltage driver circuit 52. Since current flowing in windings 31u to 31w of compressor motor 31 is approximately 2 A at maximum which is relatively small compared to drum motor 11, resistance at shunt resistance 48a to 48c is set to 0.33Ω, for example.

Power supply circuit 39 has a series circuit composed of resistor elements 83a and 83b functioning as a voltage divider circuit constituting a voltage detector provided between its output terminal and ground. Common connection point of resistor elements 83a and 83b are connected to the input terminal of control circuit 30. Control circuit 30 reads the incoming input voltages from inverter circuits 32 and 47 which have been divided by resistor elements 83a and 83b, and utilizes the read voltage as a reference for determining the PWM signal duty.

Figures 17, 17A:
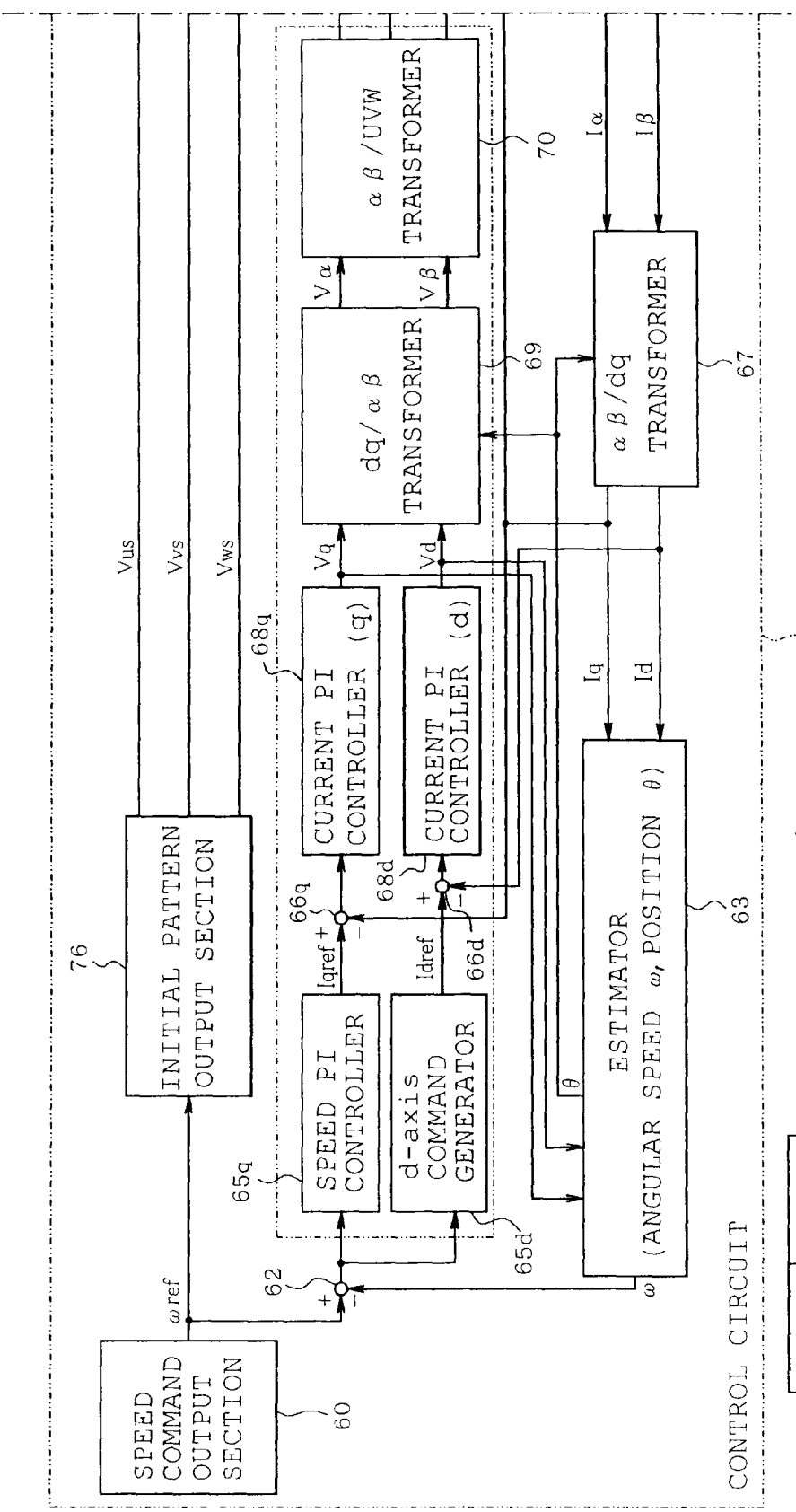
FIGS. 17A and 17B are functional block diagrams of a sensorless field oriented control of drum motor.
Figure 17B:
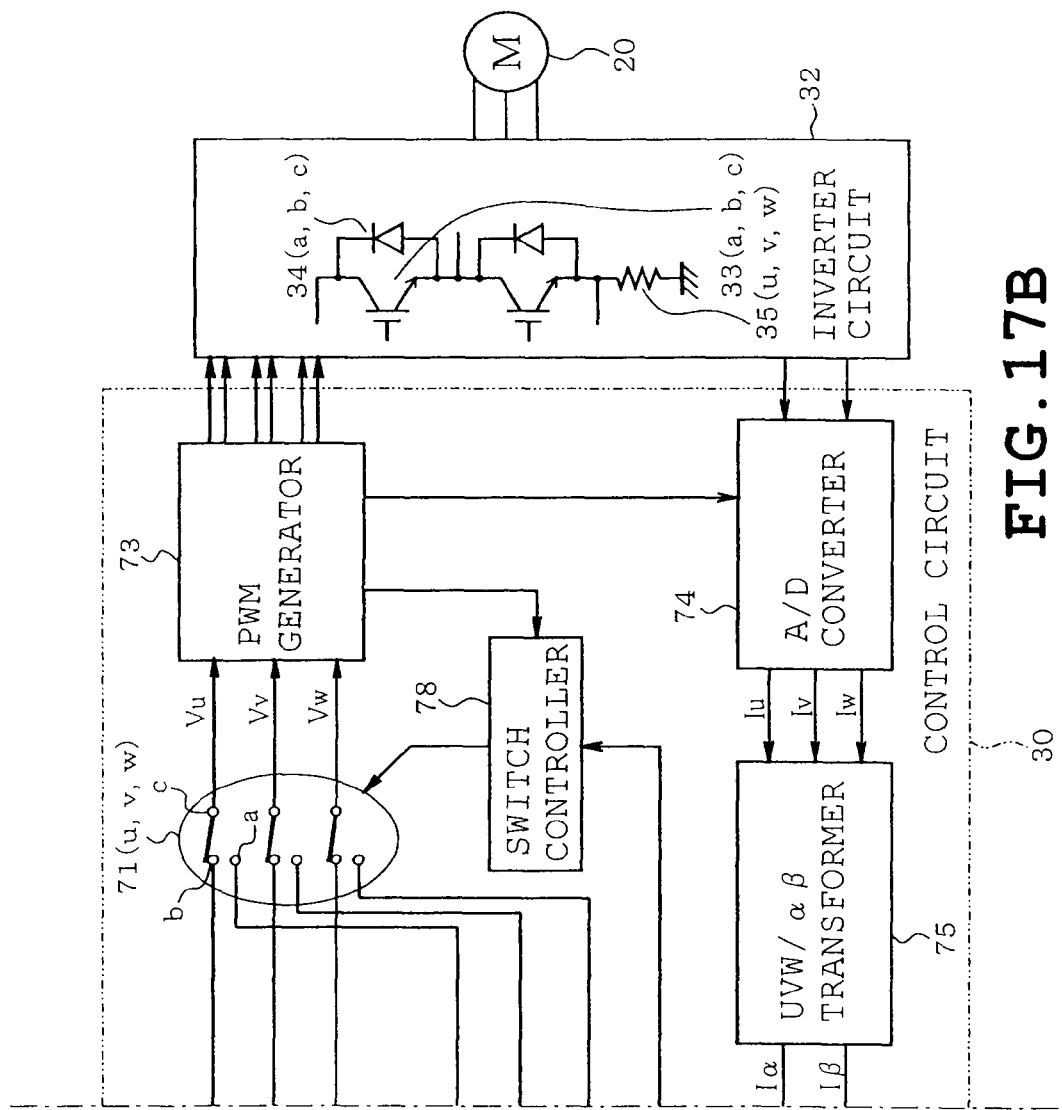

FIG. 17 is a functional block diagram of sensorless field oriented control performed by control circuit 30 on drum motor 11 and compressor motor 31. FIG. 17 only shows the sensorless field oriented control performed on drum motor 11 for simplicity. The illustrated configuration is substantially the same as those disclosed in publications such as JP 2003-181187 A and hence, will only be briefly described. Of note is that (α,β) in FIG. 17 indicate the orthogonal converted coordinate system of three phase (UVW) coordinate system having 120 degree electric angular interval between each phase, whereas (d,q) indicate the coordinate system of secondary magnetic flux that rotates with rotation of rotor of drum motor 11.

Subtractor 62 receives target speed command ωref as the minuend from speed output section 60 and estimated speed ω of drum motor 11 estimated by estimator 63 as subtrahend and provides the difference to speed PI (Proportional Integral) controller 65q. Speed PI controller 65q performs PI control based on the difference of target speed command ωref and estimated speed ω to produce q-axis current command Iq_ref which is outputted to subtractor 66q as a minuend. On the other hand, d-axis command generator 65d, when generating d-axis current command Id_ref based on target speed command ωref, outputs the same to subtractor 66d as a minuend.

In a field oriented control, d-axis current command Id_ref is generally set at "0" to drive drum motor 11 by full field control. However, when in the high speed rotation range during dehydration, field-weakening control is performed by setting a negative value to current command Id_ref in order to increase the count of rotation. Subtractors 66q and 66d receive q-axis current Iq and d-axis current Id as subtrahends respectively that are outputted from αβ/dq transformer 67, and the difference is given to current PI controllers 68q and 68d, respectively. The control period at speed PI controller 65q is set at 1 m second.

Current PI controllers 68q and 68d perform PI control based on the difference between q-axis current command Iq_ref and d-axis current command Id_ref to generate q-axis voltage command Vq and d-axis voltage command Vd which are outputted to dq/αβ transformer 69. Rotational phase angle (rotor position angle) θ of secondary magnetic flux estimated by estimator 63 is given to dq/αβ transformer 69, and dq/αβ transformer 69 in turn converts voltage commands Vd and Vq into voltage commands Vα and Vβ based on rotational phase angle θ.

Voltage commands Vα and Vβ are converted into three-phase voltage commands Vu, Vv, and Vw by αβ/UVW transformer 70 and thereafter outputted to be given to one side of the stationary connection points 71ua, 71va, and 71wa of switches 71u, 71v, and 71w, whereas the stationary connection points 71ub, 71vb, and 71wb in the remaining other side are provided with voltage commands Vus, Vvs, and Vws outputted from initial pattern output section 76. Movable connection points 71uc, 71vc, and 71wc of switches 71u, 71v, and 71w are connected to the input terminal of PWM generator 73.

PWM generator 73 outputs PWM signals Vup (+, −), Vvp (+, −), and Vwp (+, −) of each phase to inverter circuit 32. The PWM signals are the result of pulse-width modulation of 15.6 kHz carrier (triangular wave) based on voltage commands Vus, Vvs, and Vws or Vu, Vv, and Vw. PWM signals Vup to Vwp are outputted as signals having a pulse width that correspond to voltage amplitude based on sinusoidal waves such that sinusoidal current is energized in each of the windings 11u, 11v, and 11w of drum motor 11 representing each phase, for example.

A/D converter 74 outputs A/D converted current data Iau, Iav, and Iaw occurring at IGBTs 33d to 33f to UVW/αβ transformer 75. UVW/αβ transformer 75 transforms three phase current data Iau, Iav, and Iaw into dual axis current data Iα and Iβ of orthogonal coordinate system according to a predetermined formula. The dual axis current data Iα and Iβ are outputted to αβ/dq transformer 67.

During the field oriented control, αβ/dq transformer 67 obtains rotor position angle θ of drum motor 11 from estimator 63. Based on rotor position angle θ, dual axis current data Iα and Iβ are transformed into d-axis current Id and q-axis current Iq that reside in the rotational coordinate system (d, q) to output them to estimator 63 and subtractors 66d and 66q as described earlier.

Estimator 63 generates estimate position angle θ and estimate rotational speed ω of rotor of drum motor 11 based on q-axis voltage command Vq, d-axis voltage command Vd, q-axis current Iq, and d-axis current Id and outputs the estimates to the required components. During startup, drum motor 11, being applied with startup pattern by initial pattern output section 76, is forcibly commutated. Then, after field oriented control has been initiated, estimator 63 is started to provide estimates of position angle θ and rotational speed ω of rotor of drum motor 11.

Switch controller 78 controls the switching performed at switches 71 based on duty information of PWM signal given by PWM generator 73. The above described configuration implemented as software at control circuit 30 with the exception of inverter circuit 32 have been represented as a block diagram. Current control period in the field oriented control is set at 128μ seconds.

The configuration shown in FIG. 17 is partially omitted for simplicity. The omitted portions are shown in FIGS. 16 and 18.

Figure 18:
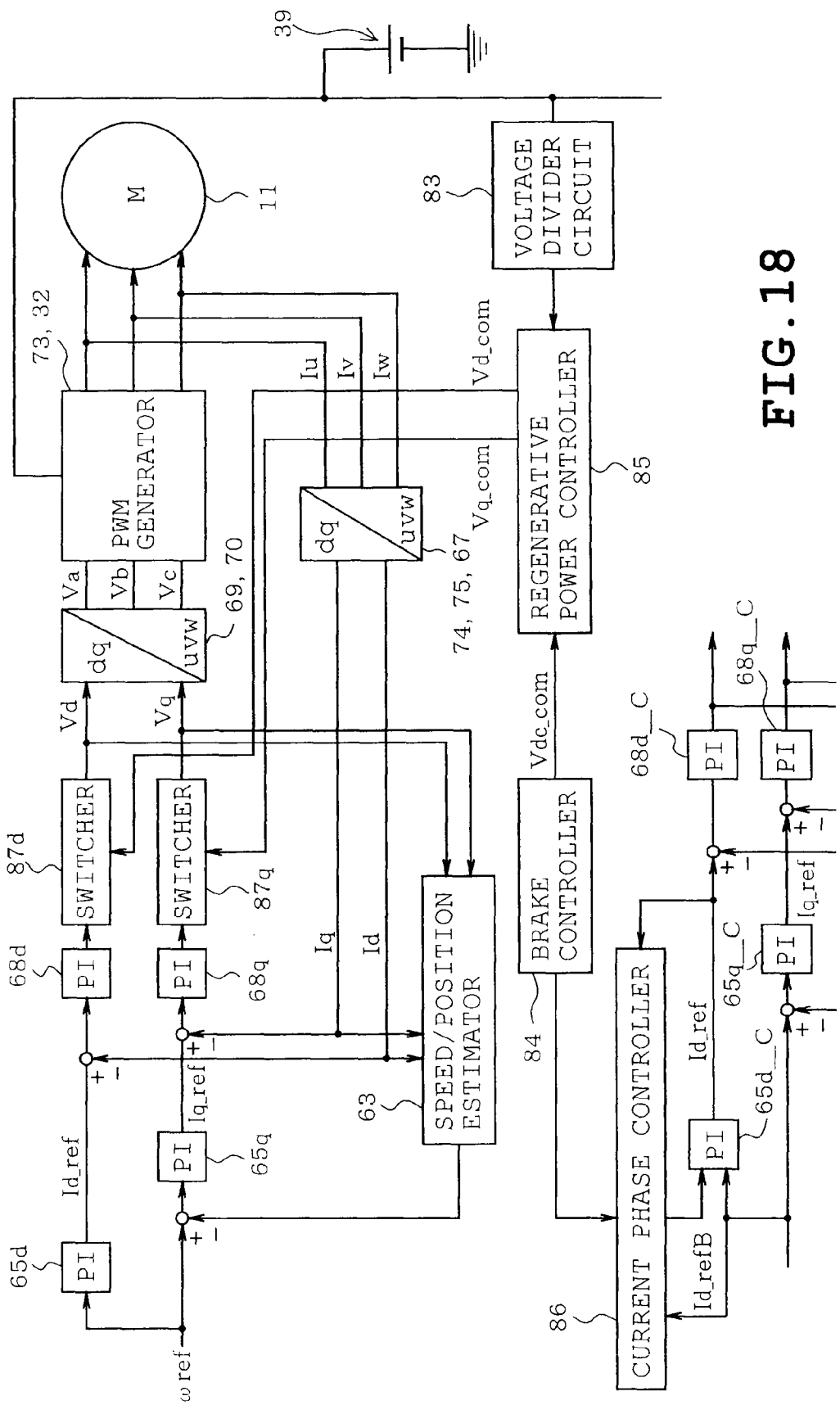
FIG. 18 is a functional block diagram of a portion of FIG. 17, a portion of field oriented control calculator of compressor motor side, and sections that input/output control signals between the foregoing.

FIG. 18 provides a partial illustration of drum motor 11 circuitry shown in FIG. 17, a partial illustration of FOC calculator provided in compressor motor 31 circuitry, and the input/output sections that exchange control commands between the control sections of the foregoing. Compressor motor 31 circuitry is configured substantially the same as the drum motor 11 circuitry and thus, the functional blocks representing the components of compressor motor 31 circuitry are simply suffixed by "_C" for distinction. Brake controller 84 controls braking activated at high-speed rotation of rotary drum 4 during dehydration and gives voltage command Vdc_com to regenerative power controller 85 while giving phase control command P_com to current phase controller 86.

Regenerative power controller 85 generates voltage commands Vq_com and Vd_com based on detected voltage Vdc and voltage command Vdc_com given through voltage divider circuit 83 and outputs the generated voltages to voltage command switchers 87q and 87d, respectively. Voltage command switchers 87q and 87d are disposed between PI controllers 68q, 68d and dq/UVW transformer 69, and normally selects and outputs voltage commands Vq and Vd given by PI controllers 68q and 68d;however if provided with voltage commands Vq_com and Vd_com from regenerative power controller 85, voltage commands Vq_com and Vd_com are selected for output.

Current phase controller 86 generates and outputs d-axis current command Id_refB for applying braking on drum motor 11 based on phase control command P_com given by brake controller 84 and d-axis current command Id_ref outputted at that point in time by d-axis command generator 65d_C provided at the compressor circuitry side. During normal operation, d-axis command generator 65d_C generates and outputs d-axis current command Id_ref based on target speed ωref of compressor motor 31 as in the case of drum motor 11. However, when d-axis current command Id_refB is given by current phase controller 86, d-axis current command Id_refB is selected and outputted.

Next, the operation of the present exemplary embodiment will be described with reference to FIGS. 1 to 15. When rotary drum 4 has been drained, dehydration is performed according to dehydration operation pattern shown in FIG. 8, for example. Dehydration operation pattern comprises a positioning mode and a positive rotation mode which are defined by combination of drive commands, voltage command Vc, and phase command Pc. Control circuit 30 outputs energization signals Du, Dv, and Dw including voltage command Vc component and phase command Pc component to PWM generator 73, and PWM generator 73 in turn generates and outputs drive signals Vup, Vun, Vvp, Vvn, Vwp, and Vwn to output voltage from inverter circuit 32.

Figure 9:
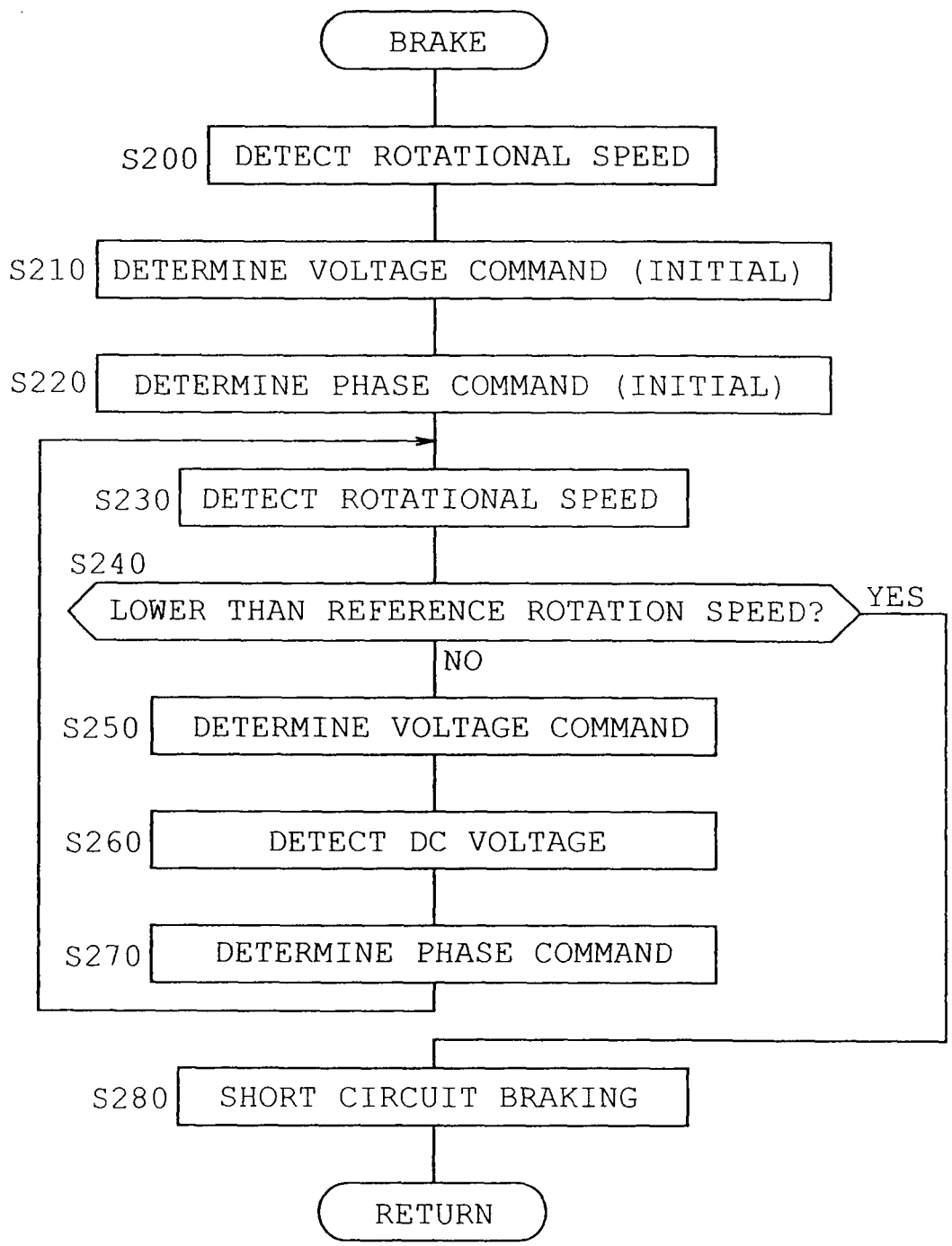
FIG. 9 is a flowchart indicating a process flow of a braking operation.

When duration of dehydration reaches the preset time, braking process is executed as shown in FIG. 9. As the first step of the process, control circuit 30 detects the rotational speed (step S200) based on sensor position signals Hu, Hv, and Hw given by rotation sensor 82 (u, v, and w). Then, voltage command Vc is determined (step S210) based on rotational speed, and phase command Pc is determined thereafter (step S220). That is, voltage command Vc and phase command Pc are initialized depending upon the detected rotational speed to select a brake pattern.

Figure 10:
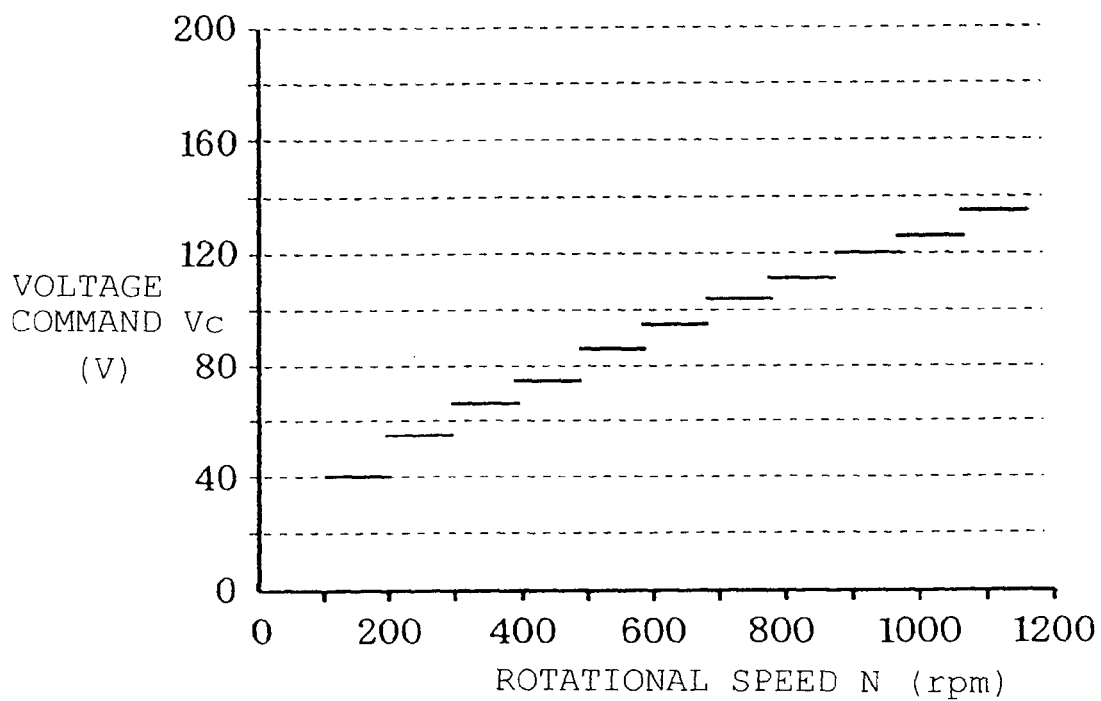
FIG. 10 is a table indicating variance in voltage command Vc in a braking operation.
Figure 11:
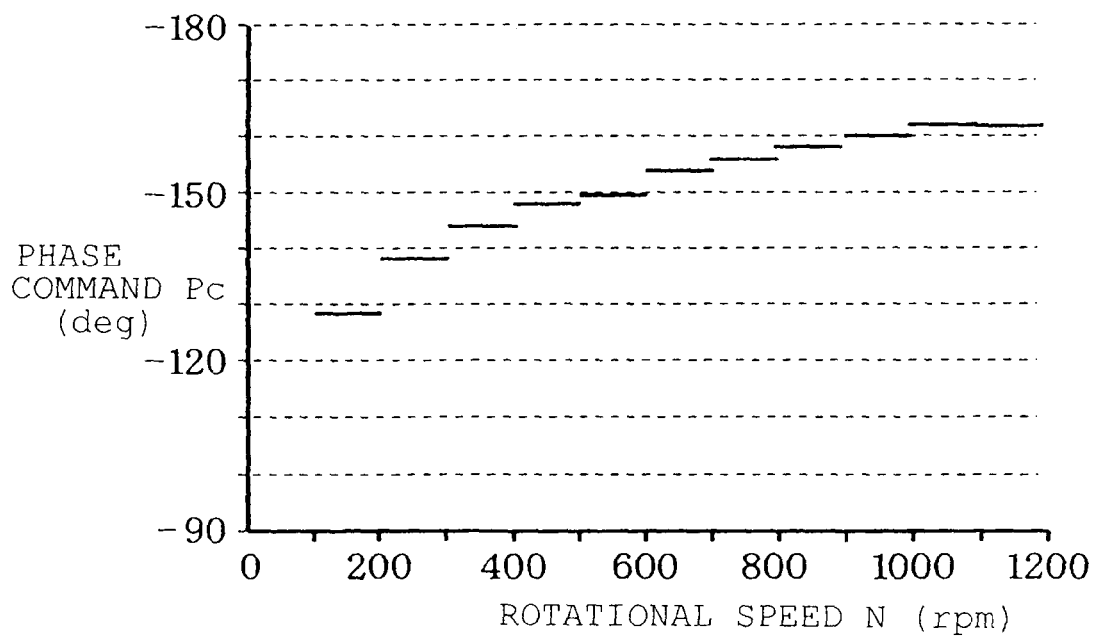
FIG. 11 is a table indicating variance in phase command Pc in a braking operation.

Voltage command Vc and phase command Pc are determined based on braking data table indicated in FIGS. 10 and 11 which are stored in ROM provided in control circuit 30. Phase command Pc indicates the phase of voltage outputted at each phase of inverter circuit 32 which is based upon the induced voltage generated at windings 11u, 11v, and 11w of drum motor 11. Current phase flowing in each phase is delayed relative to the induced voltage. Energization signals Du, Dv, and Dw are generated based on phase command Pc, voltage command Vc, and position detection signals Hu, Hv, and Hw, and IGBTs 33a to 33f are switched ON/OFF based on energization signals Du, Dv, and Dw. At this instance, the delay of current phase in each of the phases creates flow of regenerative motor energy toward drive power supply circuit 39 to provide a braking effect, and the generated regenerative electric power is charged in condensers 42a and 42b.

If a "NO" decision is made at step S240, steps S230 to 270 are repeated in the period of approximately 50 m seconds. When rotational speed is redetected at step S230, determination is made as to whether or not the detected rotational speed is lower than the preset reference rotational speed which is a threshold to determine whether or not regenerative braking can be maintained (step S240). If the detected rotational speed is greater than the reference rotational speed (step S240: NO), the process proceeds to step S250 and determines voltage command Vc from the data table given in FIG. 10. Then, the detected voltage given by voltage divider circuit 83 is read (step S260) to determine phase command Pc by the following method (step S270). That is, currently detected voltage DCO and reference voltage DCR can be represented by the following equations.

$$DCO<DCR \rightarrow \text{phase command } Pc=Pc+\alpha \qquad (1)$$

$$DCO>DCR \rightarrow \text{phase command } Pc=Pc-\alpha \qquad (2)$$

Of note is that α is a predetermined unit modifier.

Figure 12:
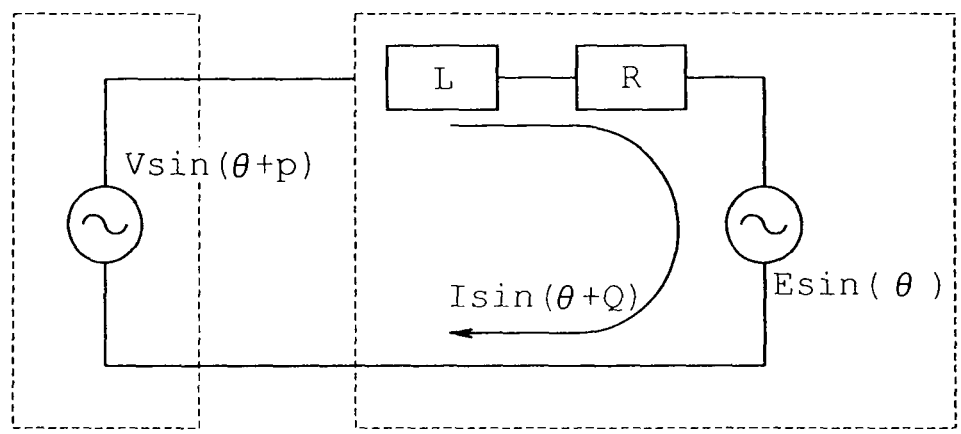
FIG. 12 indicates an equivalent circuit of a single phase of a motor.

Next, braking applied by the periodic execution of steps S230 to 270 will be described with reference to FIGS. 12 to 15. FIG. 12 indicates an equivalent circuit representing a single phase of drum motor 11 in which the output of inverter circuit 32 is represented as AC power supply, and drum motor 11 is represented as AC power supply corresponding to inductance L, winding resistance R, and induced voltage. The torque of drum motor 11 is proportional to the product of induced voltage and winding current, whereas the heat generated by drum motor 11 is a product of winding resistance and the square of winding current, and the supplied electric power is a product of the output voltage of inverter circuit 32 and winding current.

Figure 13:
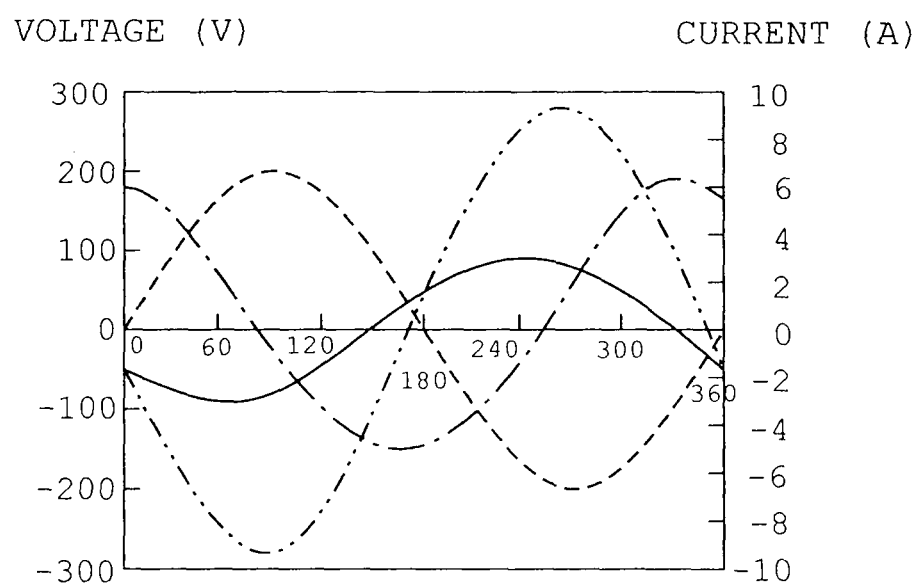
FIG. 13 is a chart indicating a relation between output voltage of an inverter circuit, induced voltage, and winding current at rotational speed 600 rpm during a braking operation.

FIG. 13 indicates the relation between: the output voltage of inverter circuit 32 represented by solid line, induced voltage represented by broken line, and winding current represented by single dot chain line when rotational speed is 600 rpm, for example, during braking operation. Further, the difference between the inverter output voltage and the induced voltage is represented by double dot chain line. FIG. 10 shows that the output voltage of inverter circuit 32 has a phase voltage amplitude of 90V, and FIG. 11 shows that the phase of inverted voltage is −150 deg. Winding current is determined by inductance, winding resistance, and induced voltage, and in this case, indicates −250 deg as can be seen in FIG. 13.

Torque is given by a product of induced voltage and winding current indicated in FIG. 13. However, since the phase difference between induced voltage and winding current is 90 deg or greater, the torque represents a negative torque, functioning as a braking torque. Supplied electric power is a product of the output voltage of inverter circuit 32 and winding current, and since the phase difference between them is again, 90 deg or greater, the electric power represents a negative power, meaning that power is in a regenerative state.

Figure 14:
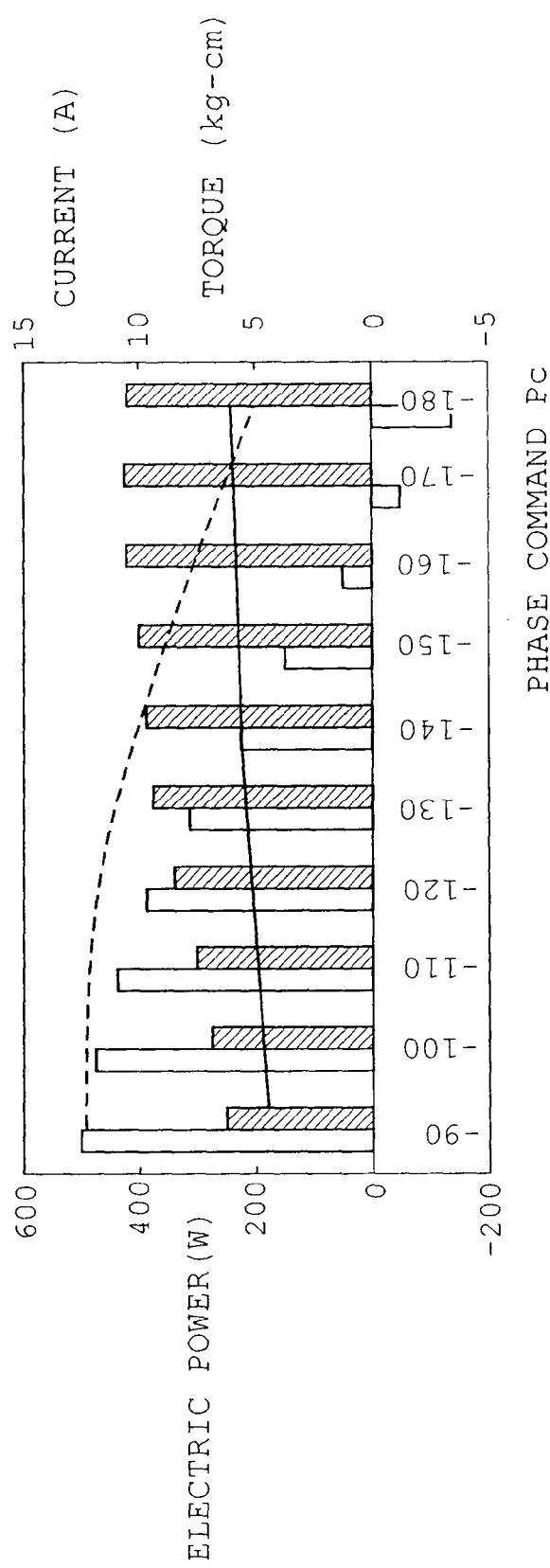
FIG. 14 is a chart indicating a relation between phase command Pc and regenerative electric power.

Relation between phase command Pc and regenerative power will be described with reference to FIG. 14. FIG. 14 represents regenerative electric power (white bar graph), amount of heat generated by the motor (hatched bar graph), winding current (solid line), and braking torque (broken line). When phase command Pc is modified in the positive direction, winding current phase is also modified in the positive direction to increase the regenerative electric power, whereas when phase command Pc is modified in the negative direction, winding current phase is also modified in the negative direction to reduce the regenerative electric power.

Figure 15:
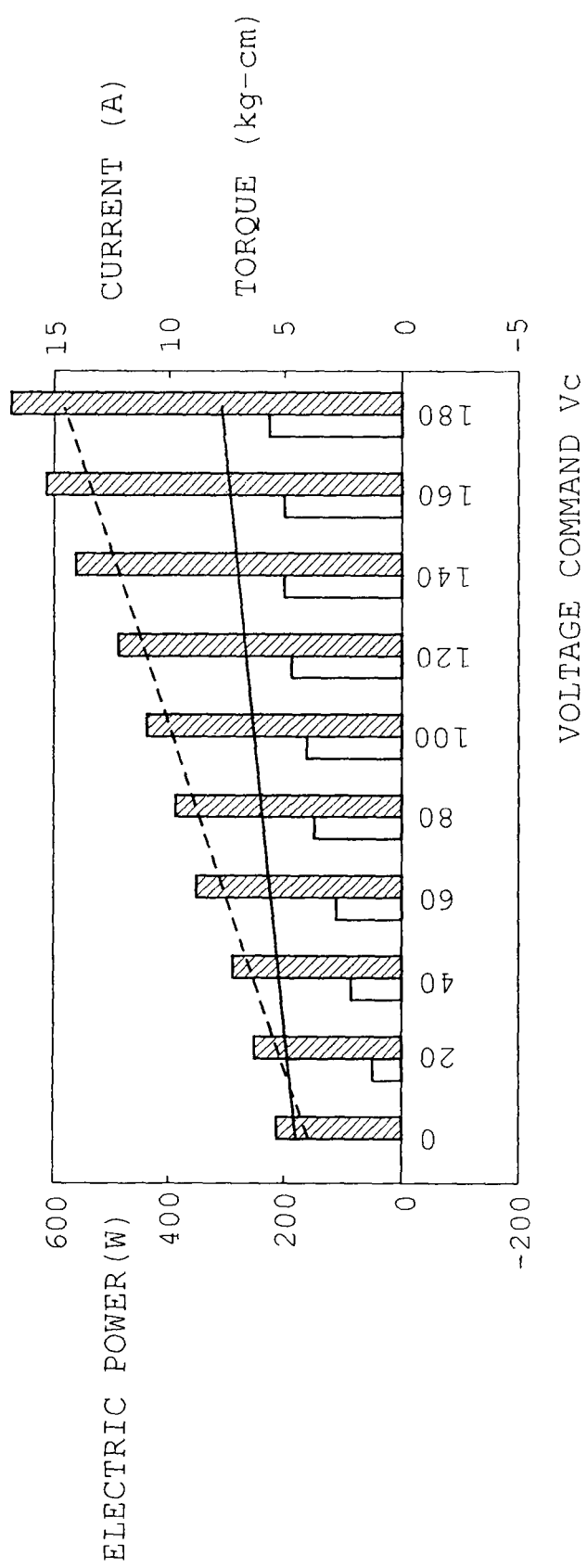
FIG. 15 is a chart indicating a relation between phase command Vc and braking torque.

The relation between voltage command Vc and brake torque will be described with reference to FIG. 15. FIG. 15 represents the relation between regenerative power (white bar graph), amount of heat generated by the motor (hatched bar graph), winding current (solid line), and brake torque (broken line) when voltage command Vc is modified under the rotational speed of 600 rpm and phase command Pc of −150 deg. It can be understood from FIG. 15 that winding current is increased as voltage command Vc is increased to increase the brake torque, and winding current is reduced as voltage command Vc is reduced to reduce brake torque.

At step 270 of FIG. 9, when detected voltage DCO is lower than reference value DCR, since regenerative electric power is lower than the reference value, the resulting braking operation is thus, low. Hence, phase command Pc is determined in the increasing direction to increase the regenerative electric power and consequently the braking force, thereby increasing the DC voltage at drive power supply circuit 39. When detected voltage DCO is greater than reference value DCR, since regenerative electric power is greater than the reference value, electric components such as condensers 42a and 42b of drive power supply circuit 39 may be adversely affected, however such risk is alleviated by reducing phase command Pc to reduce regenerative power and consequently the DC voltage at power supply circuit 39. Since the regenerative electrical power is maintained constant, even if electric power supply from AC power supply 40 is stopped by power failure, for example, the control circuit 30 is allowed to continue its operation because the operation of constant voltage circuit 45 is maintained by the above configuration.

As described above, the operation of regenerative braking reduces the rotational speed of drum motor 11 and consequently the regenerative braking operation itself. Then, at step S240, if determined that the detected rotational speed is lower than the preset reference rotational speed, the process proceeds to step S280 where a switch is made to short circuit braking. In short circuit braking, IGBTs 33a, 33c, and 33e at the upper arm of inverter circuit 32 are turned off and IGBTs 33b, 33d, and 33f at the lower arm of inverter circuit 32 are turned on to place all of windings 11u, 11v, and 11w of drum motor 11 in the short circuited state.

Figure 1:
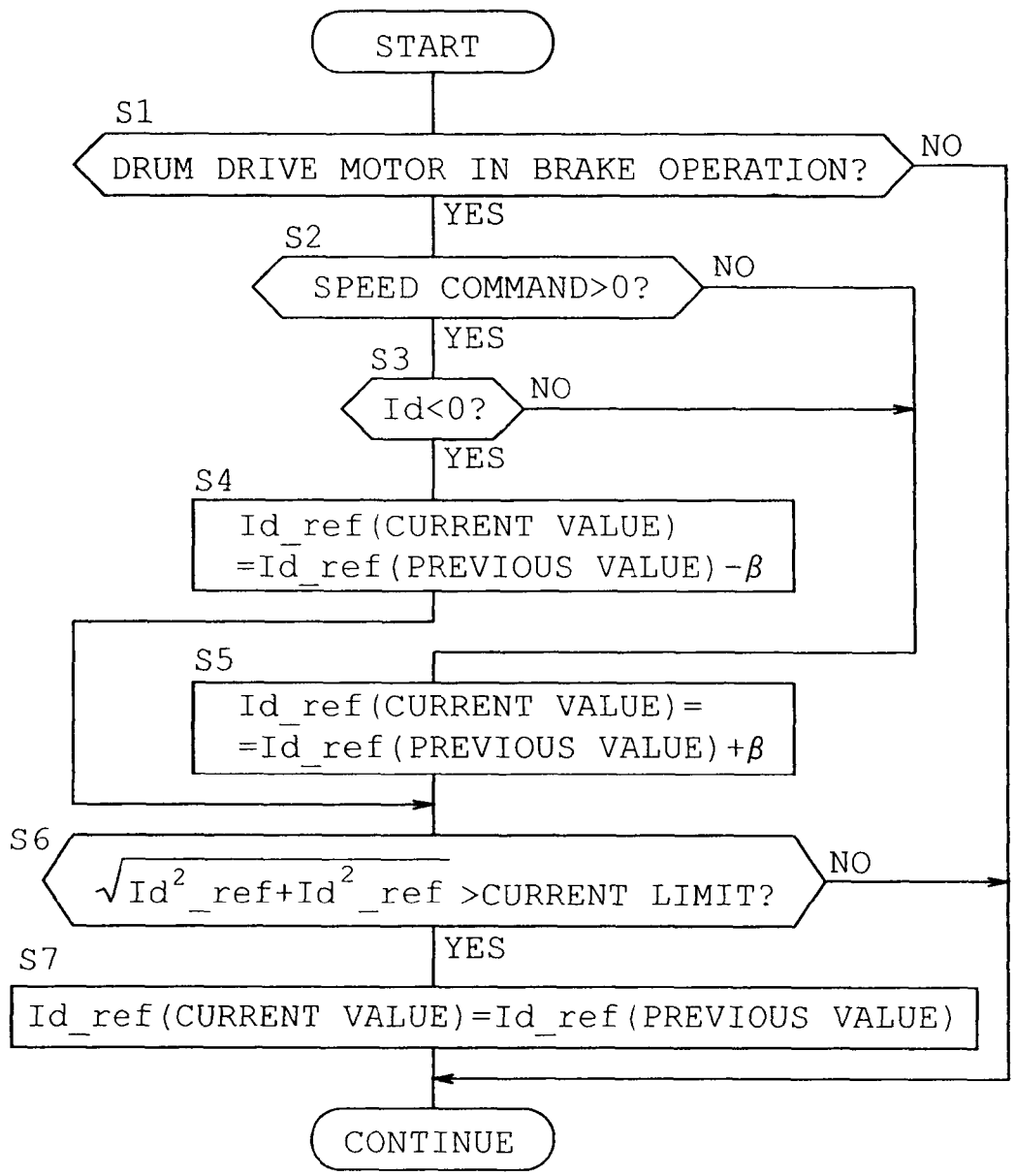
FIG. 1 is a flowchart indicating a process flow carried out at a brake controller and a current phase controller when braking is applied on a rotary drum according to a first exemplary embodiment of the present invention.

The above describes a basic operation of regenerative braking performed solely at rotary drum side. The present exemplary embodiment, however, further utilizes the drive system of compressor 15 side to further improve the braking operation as will be described with reference to FIGS. 1 to 7. FIG. 1 is a flowchart indicating the process flow of brake controller 84 and current phase controller 86.

As the first step of the process flow, a determination is made as to whether or not braking is activated at drum motor 11 (step S1) and if so (step S1: YES), a determination is made as to whether or not speed command ωref of compressor motor 31 is grater than "0" (step S2). If compressor 15 is inactive and the aforementioned speed command ωref is "0" (step S2: NO), the process proceeds to step S5 in which d-axis current command Id_ref is increased by a predetermined value β, and compressor motor 15 undergoes DC excitation to consume regenerative electric power.

Figure 2:
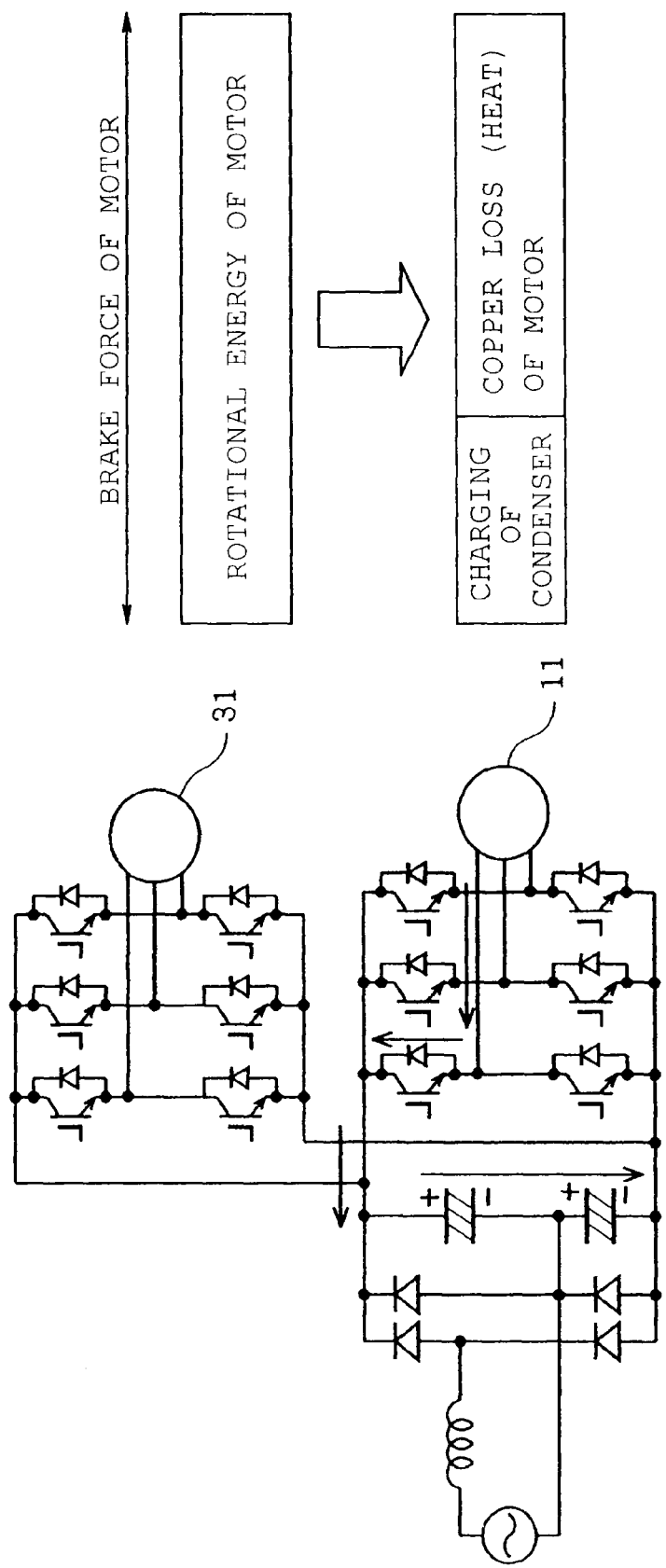
FIG. 2 is a diagram describing regenerative brake force when electric power is not consumed at compressor motor side.
Figure 3:
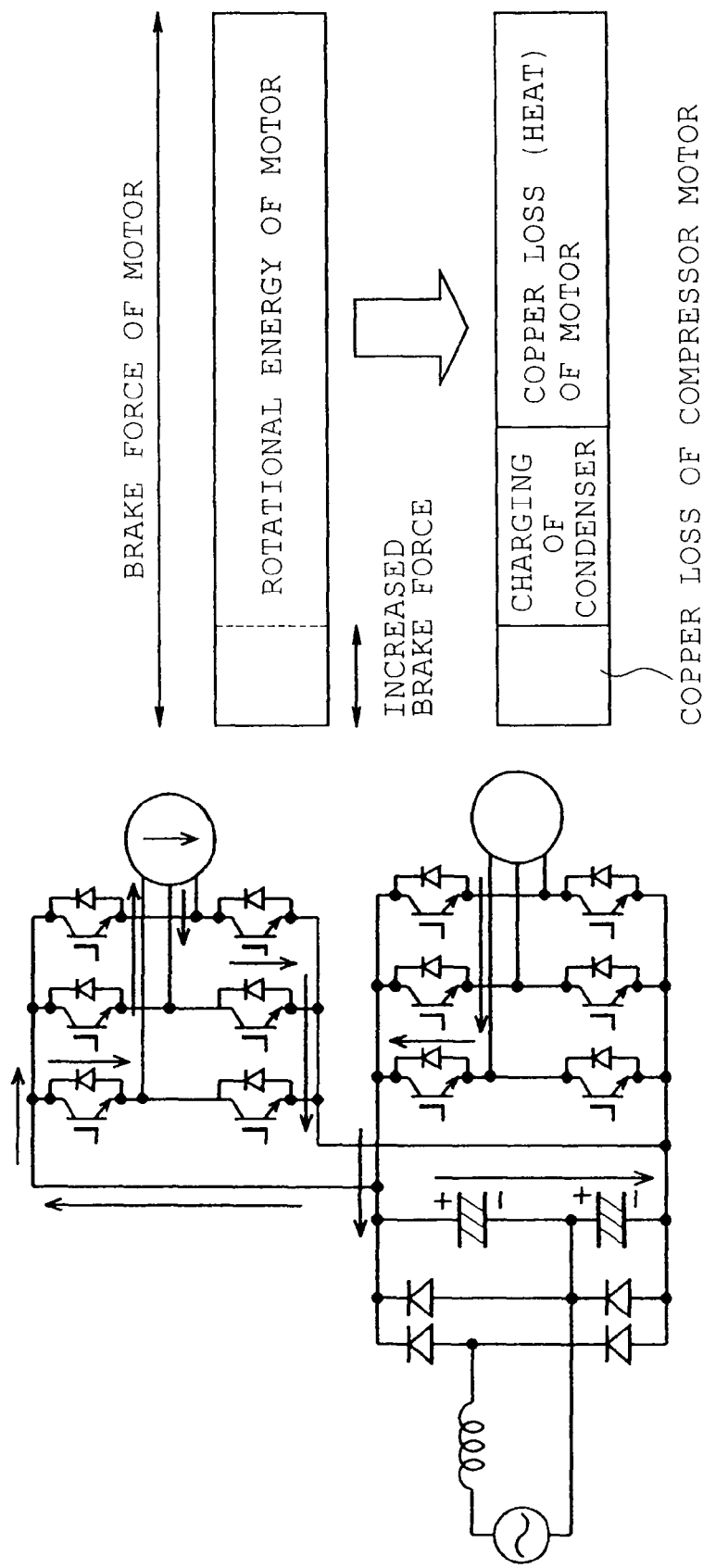
FIG. 3 corresponds to FIG. 2 indicating the case where DC excitation is carried out at the compressor motor side.
Figure 4A:
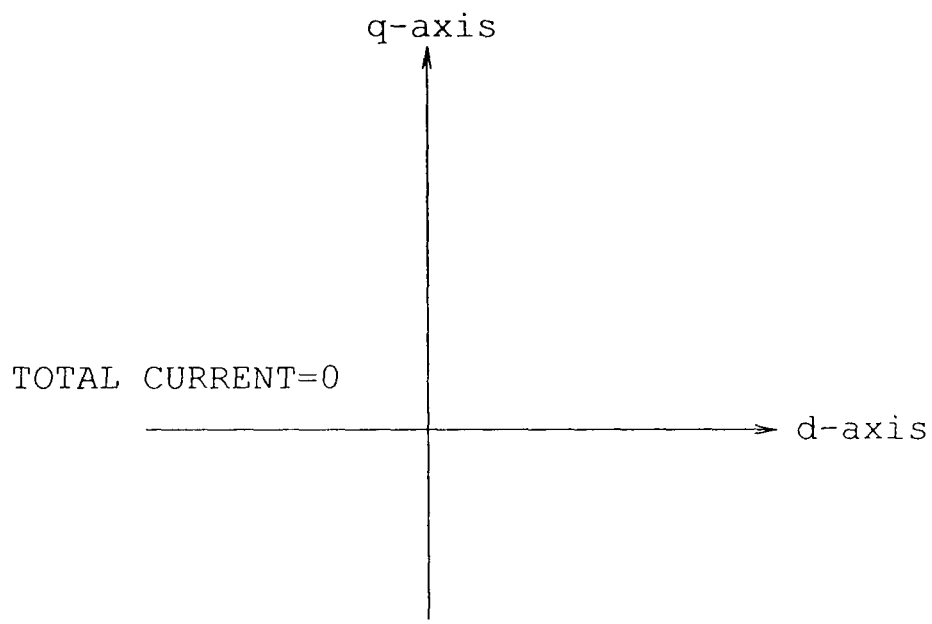
FIGS. 4A and 4B are current vector diagrams of the compressor motor side indicative of the states illustrated in FIGS. 2 and 3 respectively.
Figure 4B:
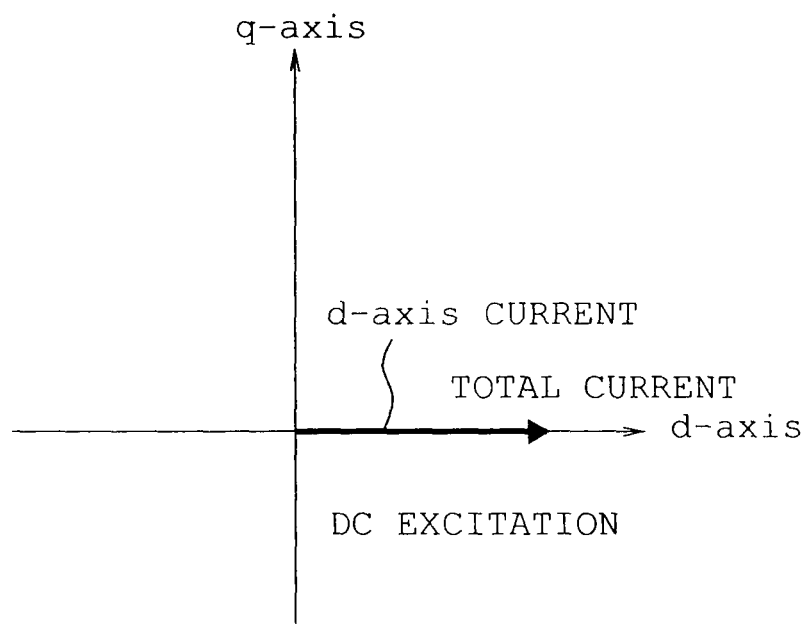

As can be seen in FIG. 2, if no electric power is consumed by compressor motor 31 side, the only regenerative brake force operated on drum motor 11 is copper loss (heat) at drum motor 11 itself and electric power charged at condensers 42a and 42b. As opposed to this, when DC excitation is executed at step S9, copper loss also occurs at compressor motor 31 and thus, electric power consumption is increased accordingly to increase the regenerative brake force as can be seen in FIG. 3. FIG. 4 represents d-q current variation at compressor motor 31 corresponding to FIGS. 2 and 3 presented in the form of a current vector diagram.

Figure 5:
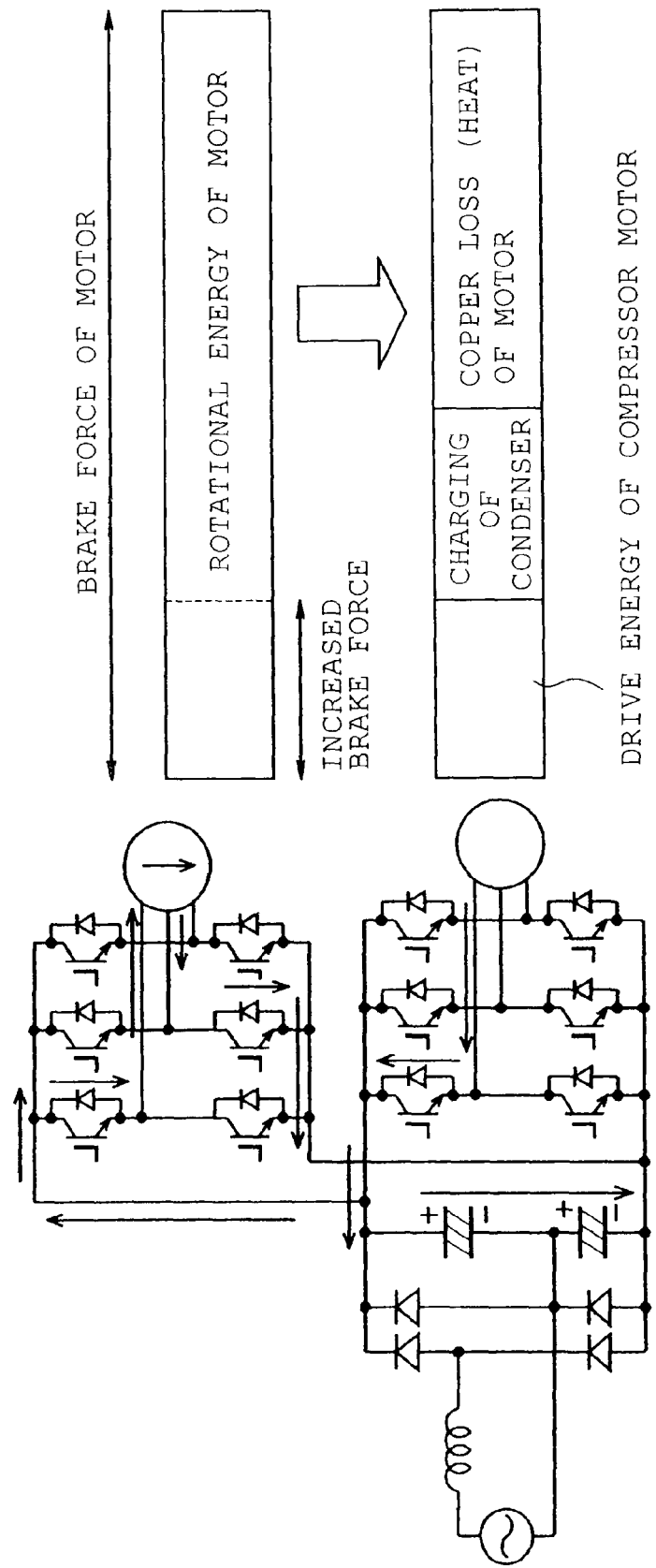
FIG. 5 corresponds to FIG. 2 when the compressor motor is driven.
Figure 6A:
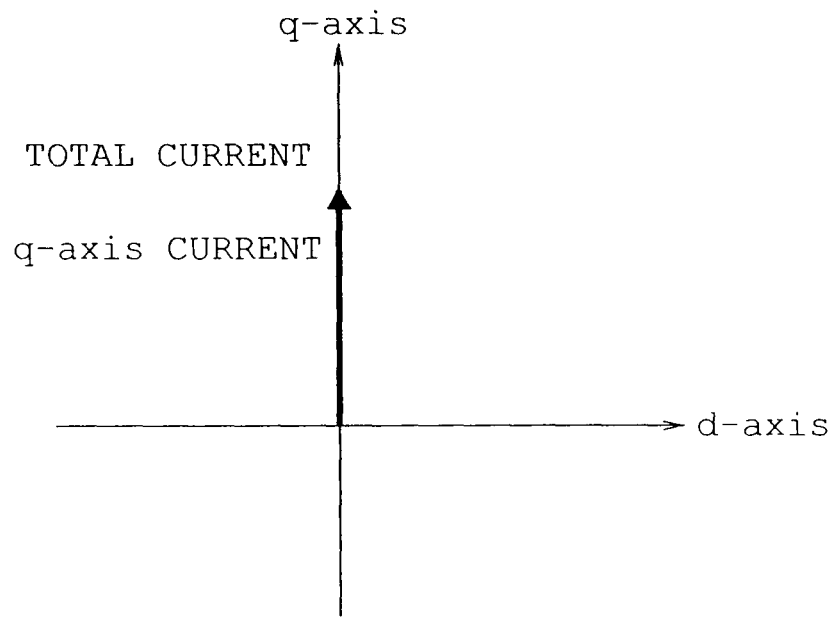
FIGS. 6A and 6B correspond to FIGS. 4A and 4B when compressor motor is driven in full field.
Figure 6B:
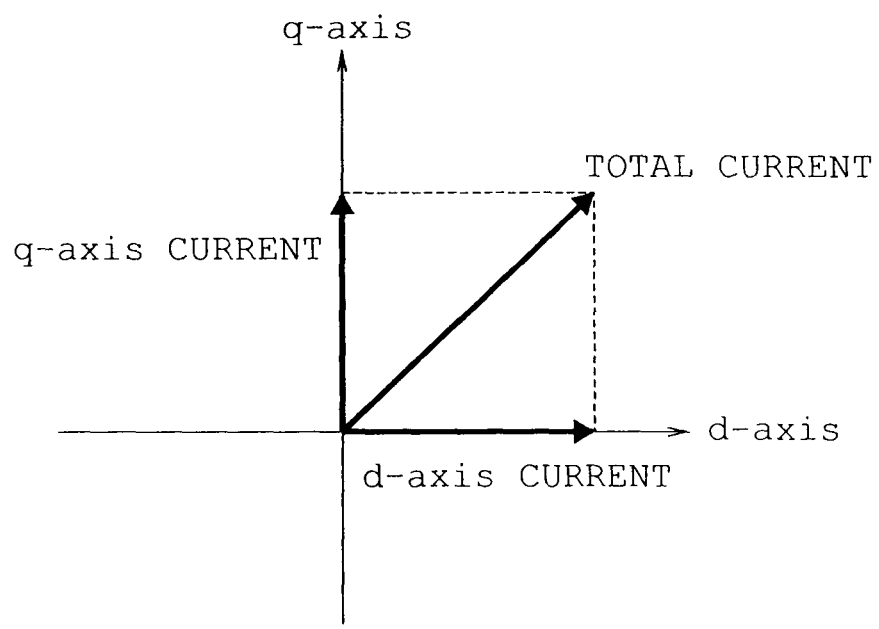

Referring back to FIG. 1, if compressor 15 is active at step S2, and if speed command ωref is greater than 0 (>0) (step S2: YES), determination is made as to whether or not d-axis current command Id_ref at that point in time is less than zero (<0) (step S3). If "Id_ref=0" (step S3: NO), it is an indication that compressor motor 31 is undertaking a full field operation, and thus, the process proceeds to step S5 to increase d-axis current command Id_ref by a predetermined value β to consume regenerative electric power. As can be seen in FIG. 5, by increasing d-axis current Id, the phase of total current is modified such that it is advanced from the most favorable condition in the full field operation, and electric power consumption by compression motor 31 is increased to consequently increase the regenerative brake force applied on drum motor 11. FIG. 6 corresponds to FIG. 5 and indicates the d-q axis current variation at compressor motor 31.

Figure 7A:
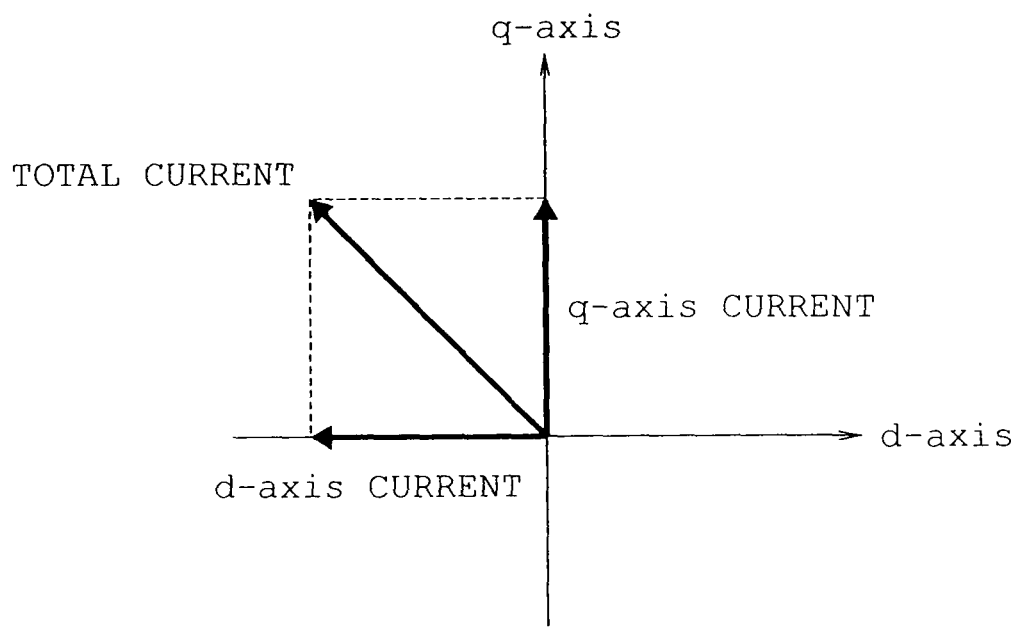
FIGS. 7A and 7B correspond to FIGS. 4A and 4B when compressor motor is driven in weak field.
Figure 7B:
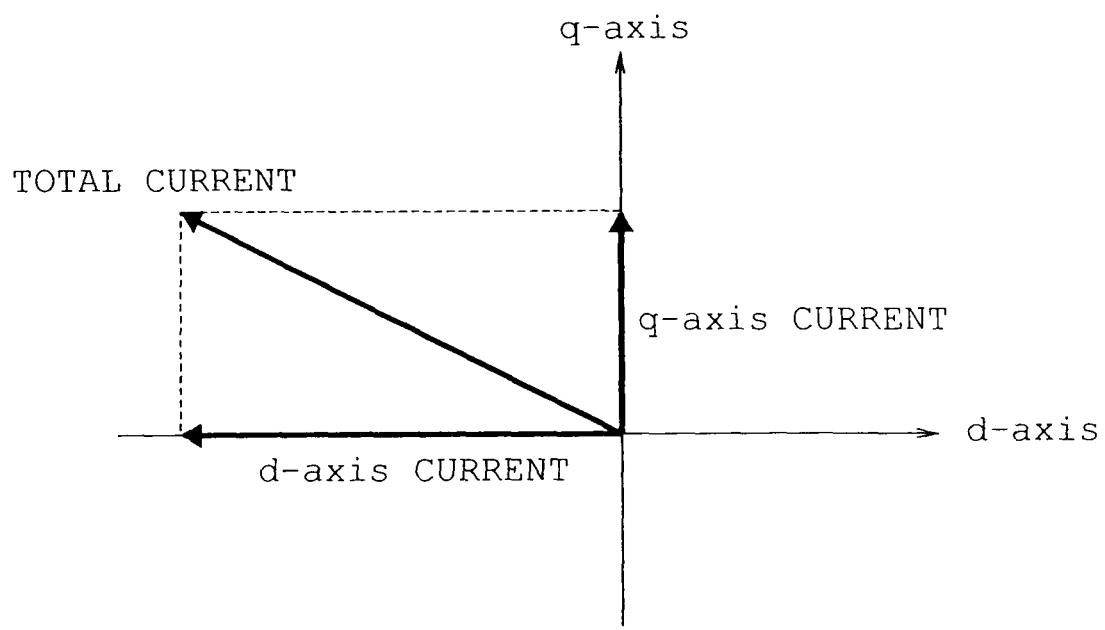
Figure 8:
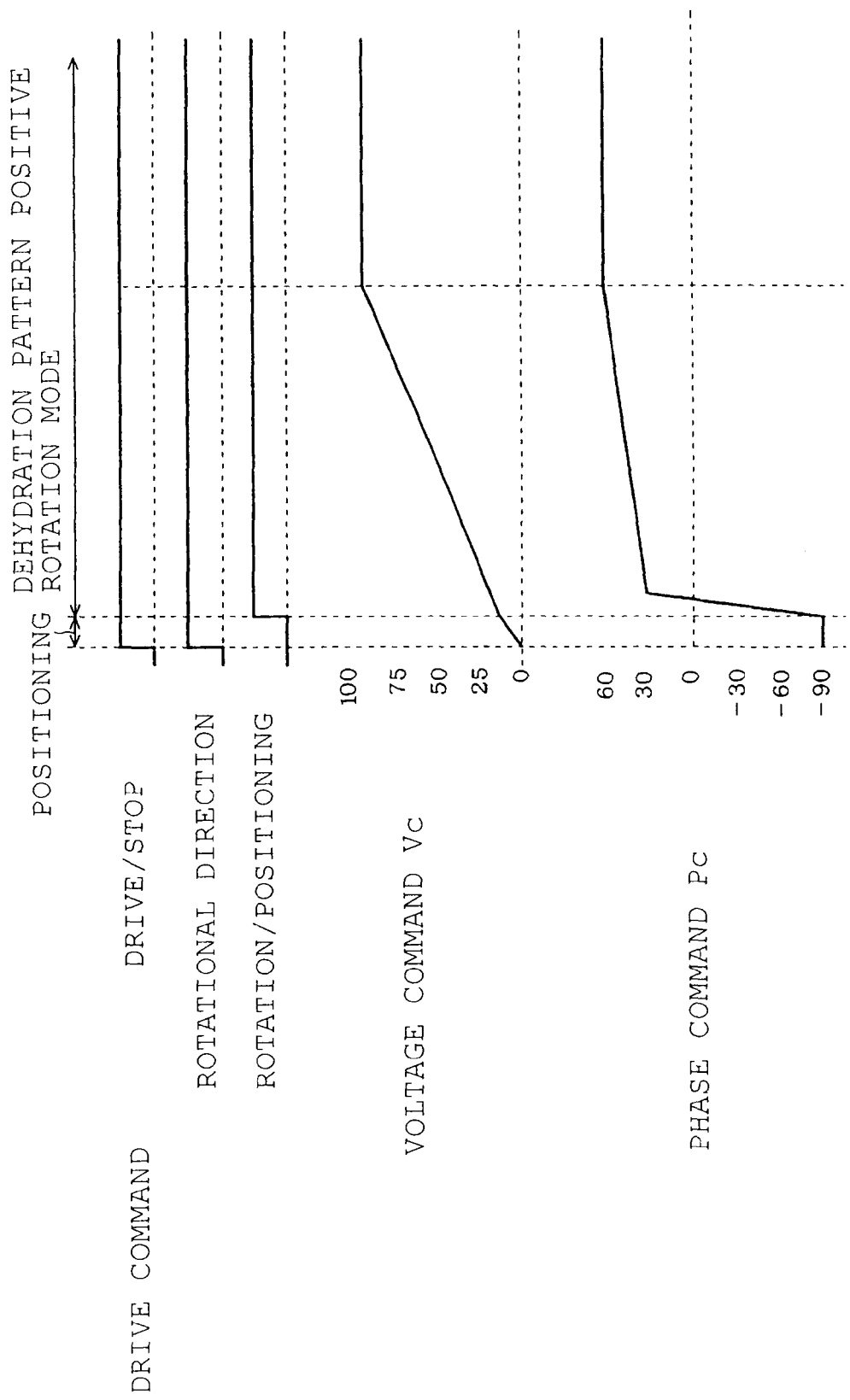
FIG. 8 is a chart indicating a dehydration operation pattern.

If "Id_ref<0" (step S3: YES), meaning that compressor motor 31 is undergoing a field weakening control, the process proceeds to step S4 and d-axis current command Id_ref is reduced by a predetermined value β and d-axis current command Id_ref in the field weakening control is increased toward the negative side, such that the phase of total current is modified to be delayed from the most favorable condition in the field weakening control to consume electric power. FIG. 7 indicates the d-q axis current variation at compressor motor 31 when the field weakening control is being carried out.

Some washer dryers are "preheat dehydration" types in which dehydration is carried out by activating rotary drum 4 and compressor 15 simultaneously so that warm air is supplied into rotary drum 4 to heat the laundry during dehydration. In case of executing such "preheat dehydration" operation, a "YES" determination is made at step S2.

After steps S4 and S5, the process proceeds to step S6 to determine whether or not total current, in other words, the square root of the square sum of d-axis current command Id_ref and q-axis current command Iq_ref has exceeded the predetermined current limit value. If the current limit value has not been exceeded (step S6: NO), the process continues as indicated as "CONTINUE" in the flowchart; whereas when the current limit has been exceeded, a value which has been set in the previous iteration is set to d-axis current command Id_ref (step S7).

According to the present exemplary embodiment described above, when control circuit 30 applies braking to complete dehydration, it further makes adjustments in regenerative electric power generated by drum motor 11 and at the same time energizes compressor motor 31 through inverter circuit 47 being driven by the same power supply as inverter circuit 32. According to the above described configuration, regenerative electric power is consumed by the drive system of compressor motor 31 as well. Thus, regenerative braking can be applied more effectively to bring rotary drum 4 to a halt in a shorter period of time.

To elaborate, control circuit 30, when applying regenerative braking on drum motor 11, performs DC excitation if compressor motor 31 is stopped; increases d-axis current Id towards the positive side to advance the energization current phase angle from the state providing the most favorable motor efficiency if compressor motor 31 is operated by full field operation; and increases d-axis current Id towards the negative side to delay the energization current phase angle from the state providing the most favorable motor efficiency if compressor motor 31 is operated by field weakening control. Thus, electric power can be consumed in controlled amounts suitable for the operational status of compressor 15 without adversely affecting compressor 15 operation.

Further, control circuit 30 controls regenerative electric power to increase the DC voltage if the detected voltage DCO of drive power source circuit 39 is lower than reference value DCR and to reduce the DC voltage if the detected voltage DCO is greater than reference value DCR, thus preventing variance in the drive power supply voltage depending upon regenerative electric power. Further, when the rotational speed of drum motor 11 is lowered to or below a predetermined rotational speed as a result of regenerative braking, a switch is made to short circuit braking to improve the braking effect by activating the short circuit braking when regenerative braking becomes less effective.

The present invention is not limited to the above described or shown exemplary embodiments but may be modified or expanded as follows.

The three different approaches taken in controlling the consumption of regenerative electric power depending upon whether compressor motor 31 is stopped, whether full field operation is executed, and whether field weakening operation is executed may be carried out selectively or in combination of 2 different approaches.

Short circuit braking carried out at step S280 is not mandatory but may be carried out on a required basis.

The present invention is not limited to the application to drum washer dryers but maybe applied to vertical washer dryers using pulsators.

The foregoing description and drawings are merely illustrative of the principles of the present disclosure and are not to be construed in a limited sense. Various changes and modifications will become apparent to those of ordinary skill in the art. All such changes and modifications are seen to fall within the scope of the disclosure as defined by the appended claims.

What is claimed is:

1. A washer dryer, comprising:
 a direct current power supply generator that generates a direct current power supply from an alternating current power supply;
 a heat pump including a compressor, a condenser, and an evaporator, the heat pump being configured to circulate refrigerant so as to be compressed at the compressor, condensed at the condenser and evaporated at the evaporator;
 an air circulatory path that introduces air heated at the condenser into a dry chamber and carrying exhaust discharged from the dry chamber to the evaporator for dehumidification to thereafter circulate the air back to the condenser for subsequent heating;
 a first inverter circuit that receives the direct current power supply generated by the direct current power supply generator to drive a compressor motor provided in the compressor;
 a rotary tub disposed rotatably within an exterior tub;
 a rotary tub motor that directly drives the rotary tub at least during dehydration;
 a second inverter circuit that receives the direct current power supply generated by the direct current power supply generator and having an output terminal connected to windings of the rotary tub motor;
 a voltage detector that detects a direct current voltage occurring between power supply buses of the second inverter circuit;
 a brake controller that, when a braking is operated upon completion of the dehydration, controls the direct current voltage within a predetermined range by controlling a regenerative electric power generated by the rotary tub motor; and
 a brake supporter that forces consumption of the regenerative electric power by the compressor motor by controlling the first inverter circuit;
 wherein when the braking is applied while the compressor motor is executing a full field operation, the brake supporter advances a current phase angle of current conducted in the compressor motor from a first state in which no phase difference exists between a voltage phase angle and a current phase angle;
 wherein when the braking is applied while the compressor motor is executing a field weakening operation, the brake supporter further delays a current phase angle of current conducted in the compressor motor from a second state in which a current phase angle is delayed from a voltage phase angle; and
 wherein if the compressor motor is stopped when the braking is applied, the brake supporter excites the compressor motor by direct current excitation.

2. The washer dryer according to claim 1, wherein the brake controller controls the regenerative electric power such that the direct current voltage is increased when the direct current voltage detected by the voltage detector is lower than a reference value and such that the direct current voltage is reduced when the direct current voltage detected by the voltage detector is greater than the reference value.

3. The washer dryer according to claim 1, wherein when rotational speed of the rotary tub motor is reduced to a predetermined rotational speed or lower when the braking is applied, the brake controller switches the brake from the regenerative braking to a short circuit braking.

* * * * *